US006481620B1

(12) United States Patent
Katou et al.

(10) Patent No.: US 6,481,620 B1
(45) Date of Patent: Nov. 19, 2002

(54) BILL RECYCLE MACHINE

(75) Inventors: Riichi Katou, Nagoya (JP); Itsunori Utsumi, Owariasahi (JP); Kunihisa Matsuura, Umibe-gun (JP); Satoshi Sera, Aichi-gun (JP); Shinji Shibata, Nagoya (JP); Katsuhiro Suzuki, Nagoya (JP); Minoru Kadowaki, Toyoda (JP)

(73) Assignee: Hitachi, Ltd., Tokoyo (JP)

( * ) Notice: Subject to any disclaimer, the term of this patent is extended or adjusted under 35 U.S.C. 154(b) by 62 days.

(21) Appl. No.: 09/639,983

(22) Filed: Aug. 17, 2000

(51) Int. Cl.[7] .................................... G06F 17/60
(52) U.S. Cl. .................................... 235/379
(58) Field of Search .................................... 235/379, 380; 209/534; 271/298

(56) References Cited

U.S. PATENT DOCUMENTS

| | | | | |
|---|---|---|---|---|
| 4,625,870 A | * 12/1986 | Nao et al. | 209/534 |
| 5,173,590 A | * 12/1992 | Nakano et al. | 209/534 |
| 5,553,320 A | * 9/1996 | Matsuura et al. | 235/379 |
| 6,012,564 A | * 1/2000 | Mukai | 194/206 |
| 6,170,822 B1 | 1/2001 | Kato et al. | |

FOREIGN PATENT DOCUMENTS

| | | |
|---|---|---|
| JP | 5-342457 | 12/1993 |
| JP | 10-188074 | 7/1998 |
| KR | 1999-0036794 | 5/1999 |

* cited by examiner

*Primary Examiner*—Thien M. Le
*Assistant Examiner*—Lisa M. Caputo
(74) *Attorney, Agent, or Firm*—Mattingly, Stanger & Malur, P.C.

(57) ABSTRACT

A bill receiving and paying port and a bill discriminating unit are arranged in the upper part of the bill recycling machine, bill accommodating boxes (a reject box, recycling boxes, and a charge and collection box) are arranged in the lower part of the bill recycling machine, and each of the reject box, and the charge and collection box is horizontally provided with two bill accommodating units. In the reject box, a bill accommodation carrying path to the reject box and a bill carrying path to the charge and collection box arranged in the lower row are provided. The low bill carrying paths are arranged in the vicinity of the sidewall face on the user manipulation side and in the vicinity of the sidewall face opposite thereto, respectively, so that the bill accommodating boxes can be made detachable in the front direction as well as in the back direction.

19 Claims, 22 Drawing Sheets

IN RECEIVED BILL COUNTING OPERATION

IN PAYMENT OPERATION

IN PAID REJECT ACCOMMODATING OPERATION

IN OPERATION OF ACCOMMODATING TAKING-FORGOTTEN BILLS

BILL RECYCLE MACHINE

BACKGROUND OF THE INVENTION

Heretofore, there has been proposed a bill recycle machine mounted to a cash automatic teller machine which is employed in a financial institution for example, the bill recycle machine including: a bill receiving and paying port into which a user casts the bills and then which sends out the bills thus cast to discharge the bills thus sent out to another user again; a bill discriminating unit for discriminating the bills; and bill carrying paths for passing the bill discriminating unit to carry therethrough the bills, the machine further including: recycle boxes for accommodating therein the bills, which serve for the payment as well as the receipt, to send the bills; a reject box for accommodating therein the received bills which are not accommodated in any of the recycle boxes, and the bills, which are not paid, of the bills which have been sent from the associated one of the recycle boxes and the received bills; and a charge and collection box for sending out the bills with which the associated one of the recycle boxes is to be filled and accommodating therein the bills which have been collected from the associated one of the recycle boxes.

This bill recycle machine, for example, is described in JP-A-10-188074.

SUMMARY OF THE INVENTION

The present invention relates in general to a bill recycle machine for dealing with bills and bill accommodating boxes for use in the same.

As the cash automatic teller machines have come into wide use, the need to further promote miniaturization, low cost and ease of use, while ensuring the conventional features and performance, has been increased more and more for the bill recycling machine, also referred to herein as a bill recycle machine. In particular, the need to realize the space saving for the place where the machine is installed has been increased, and also in addition to the miniaturization of the machine, there is desired the space saving for manipulation by a foreman such as the charge and collection of the bills made by a foreman. In addition, as for the installation place of the machine, in the case where the foreman manipulation space is defined in the back of the machine as in the automatic machine corner in financial institutions, the back manipulation type machine is desired, while in the case where the machine is installed in such a way as to just face the sidewall face of a shop, the front manipulation type machine is desired.

On the other hand, in terms of the reduction of a burden for the cash management imposed on a foreman and the improvement in the security, the charge and collection box, the recycle boxes, the reject box and the like are changed into boxes, i.e., detachable bill accommodating boxes which are in turn constructed in such a way as to be detachably manipulated.

In addition, as for the reject bills which have been generated when carrying out the dealings of receipt and payment of the bills with the bill recycle machine, there are the reject bills which have been generated due to the reason that the kinds of bills have not been able to be discriminated in the bill discriminating unit when carrying out the dealings of receipt and payment of the bills; the taking-forgotten bills and which have been generated when a user forgot to take out the paid bills; the charging reject bills which have been generated when charging the associated one of the recycle boxes with the bills from the charge and collection box for which a foreman has made the setting before beginning to carry out the dealings of receipt and payment of the bills; and the like. Thus, in terms of the management of the cash, these various kinds of reject bills can be desirably accommodated in the individual accommodating boxes, respectively. In such a manner, there has been the desired highly general purpose bill recycle machine which can cope with those individual needs.

In the above-mentioned bill recycle machine described in JP-A-10-188074, the bill recycle machine needs to be pulled out from the chassis of the cash automatic teller machine, and hence a large manipulation space is required.

In particular, according to one aspect of the present invention, there is provided a bill recycle machine having: a bill receiving port and a bill paying port, or a bill receiving and paying port; a bill discriminating unit; a plurality of bill accommodating boxes; and bill carrying paths which pass through the bill discriminating unit to connect mechanically the bill receiving part and the bill paying port, or the bill receiving and paying port and the plurality of bill accommodating boxes to each other, wherein the plurality of bill accommodating boxes are carried vertically to be made the construction which can be manipulated from the front side and the back side, and the bill accommodating unit of at least one of the plurality of bill accommodating boxes is divided into a plurality of parts. In addition, the plurality of parts of the at least one of the bill accommodating boxes thus divided are used as the reject box, the charge and charge reject box, and the like which are in turn carried on the upper row with respect to the bill accommodating boxes which are not divided (the recycle boxes). In addition, the bill carrying path leading to the second row of the divided bill accommodating boxes is provided in such a way as to pass through the bill accommodating box of the upper row.

In addition, a bill accommodating box of the present invention includes: at least one bill approach port; path means for accommodating the bills, which have entered from the bill approach port, in the bill accommodating box; and a bill exhausting port for exhausting the bills, which have entered from the bill approach port, to the lower row, wherein the bills which have entered from the bill approach port are selectively taken in the bill accommodating box or are exhausted to the lower row.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE EMBODIMENTS

The preferred embodiments of the present invention will hereinafter be described in detail with reference to the accompanying drawings.

Figure 1:
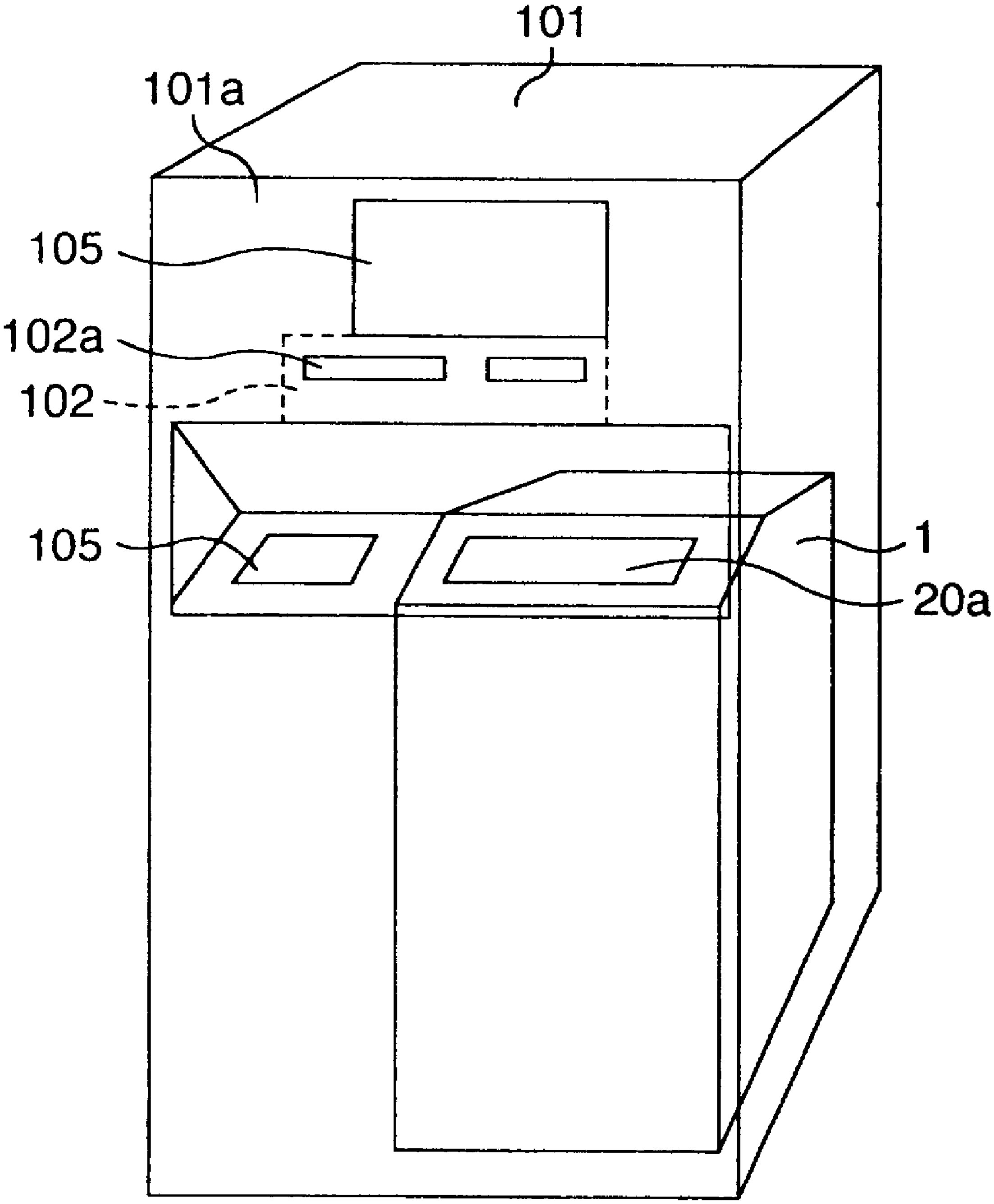
FIG. 1 is a perspective view showing the external appearance of an embodiment of a cash automatic teller machine of the present invention.

FIG. 1 is a perspective view showing the external appearance of an embodiment of a cash automatic teller machine to which the present invention is applied.

The machine inside of the upper part (the upper side with respect to a manipulation face with which a user carries out the manipulation) of a cash automatic teller machine 101 includes: a card and detailed statement processing mechanism 102 for processing a card of a user in conjunction with a card slot 102*a* which is provided in a upper front plate 101*a* to carry out the printing on a dealings detailed statement; and a customer manipulating unit 105 for displaying and inputting the contents of the dealings. In addition, the machine inside of the lower part (the lower side with respect to the manipulation face with which a user carries out the manipulation) of the cash automatic teller machine 101 includes a bill recycle machine 1 for processing the bills the front face of which is provided with a bill slot 20*a*. The cash automatic teller machine 101 executes the processings such as a deposit, payment or transfer of the bills from and to a user with a card, bills or detailed statement as the medium.

Figure 2:
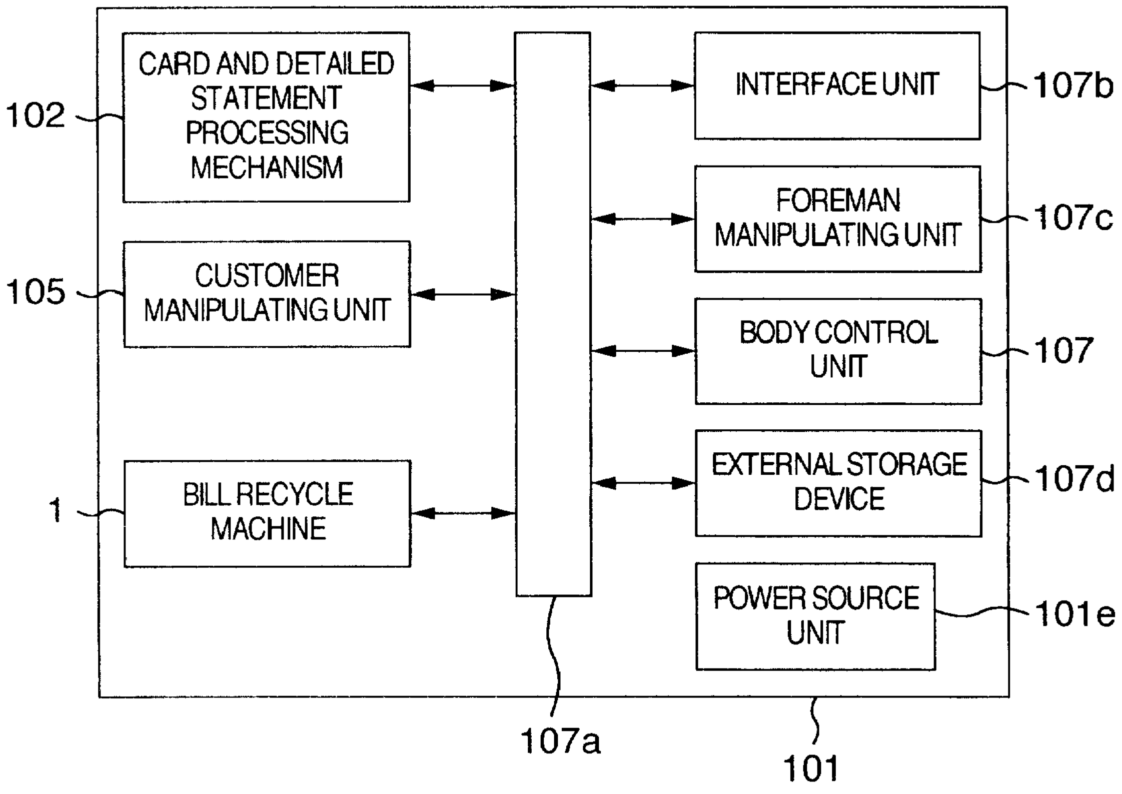
FIG. 2 is a block diagram useful in explaining the control relation of the cash automatic teller machine of the present invention.

FIG. 2 is a block diagram useful in explaining the control relation of the cash automatic teller machine of the present invention. As has already been described, the card and detailed statement processing mechanism 102, the bill recycle machine 1 and the customer manipulating unit 105 which are all accommodated in the cash automatic teller machine 101 are electrically connected to a body control unit 107 through a bus 107*a,* and are operated under the control made by the body control unit 107. In addition thereto, the body control unit 107 is also electrically connected to an interface unit 107*b,* a foreman manipulating unit 107*c* and an external storage device 107*d* through the bus 107*a,* and transfers and receives the necessary data to and from those units. But, the detailed description thereof is omitted here for the sake of simplicity. In this connection, reference numeral 101*e* shown in FIG. 2 designates a power source unit for supplying the above-mentioned constitutional elements with the electric power.

Figure 3:
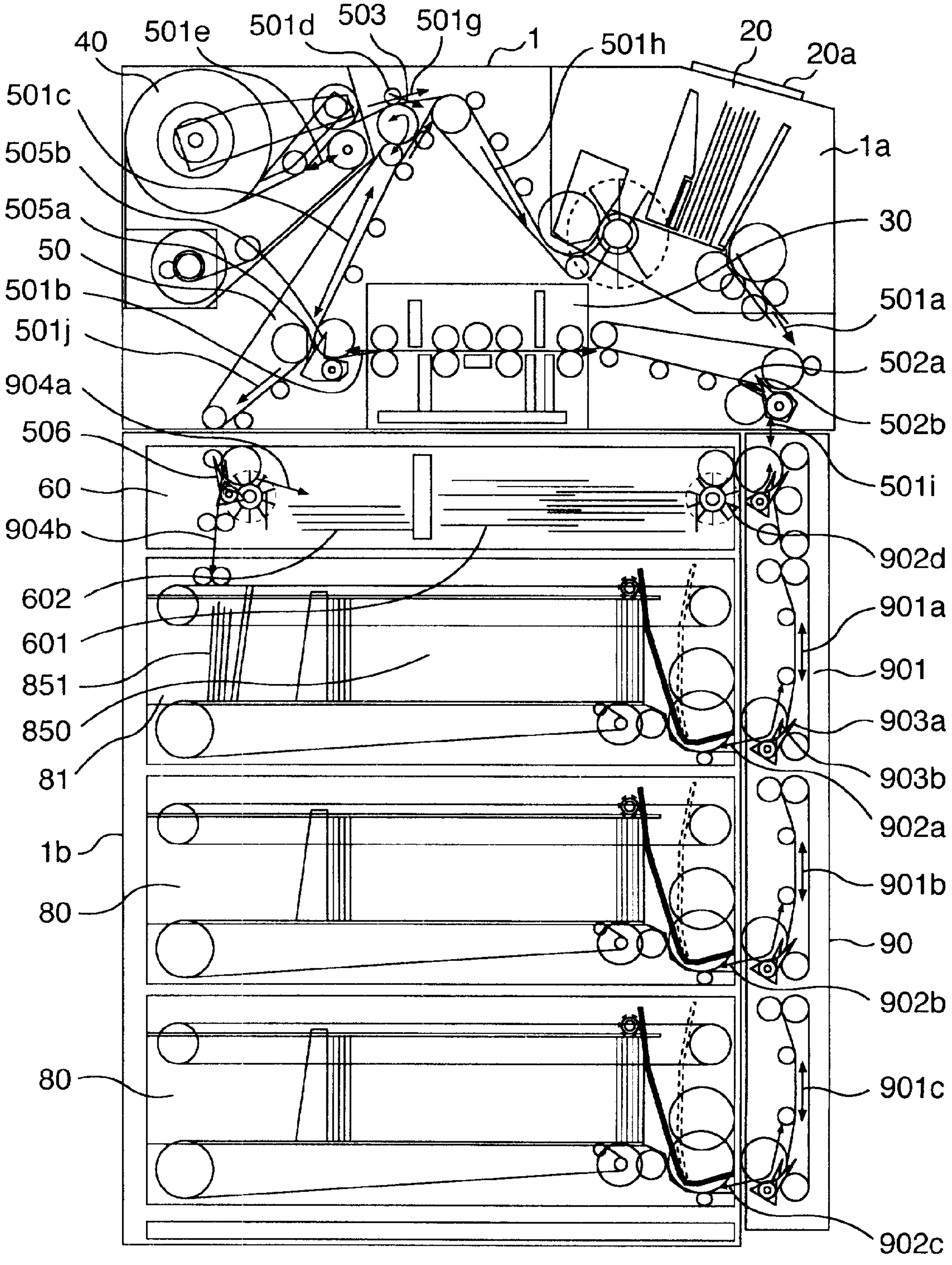
FIG. 3 is a side elevational view showing the construction of a first embodiment of a bill recycle machine of the present invention.

FIG. 3 is a side elevational view showing the construction of the bill recycle machine 1 for use in the cash automatic teller machine 101 shown in FIG. 1.

The bill recycle machine 1 includes: a bill receiving and paying port 20 into and from which a user casts and takes out bills; a bill discriminating unit 30 for discriminating bills; a temporary storage box 40 for storing temporarily therein bills, which have been received, until the dealings have been established; two recycle boxes 80 for accommodating therein bills for which the dealings have been established when receiving the bills and then paying the bills thus accommodated therein if necessary; a reject box 60 for accommodating therein the bills which are not submitted for the receipt and the payment; a charge and collection box 81 for accommodating therein the bills with which the recycle box 80 is to be filled and the bills which have been collected from the recycle boxes; a bill carrying path 50 which passes through the bill discriminating unit 30 and through which the bills are carried to the bill receiving and paying port 20, the temporary storage box 40, the reject box 60, the recycle box 80, and the charge and collection box 81; and a control unit (not shown).

Figure 4:
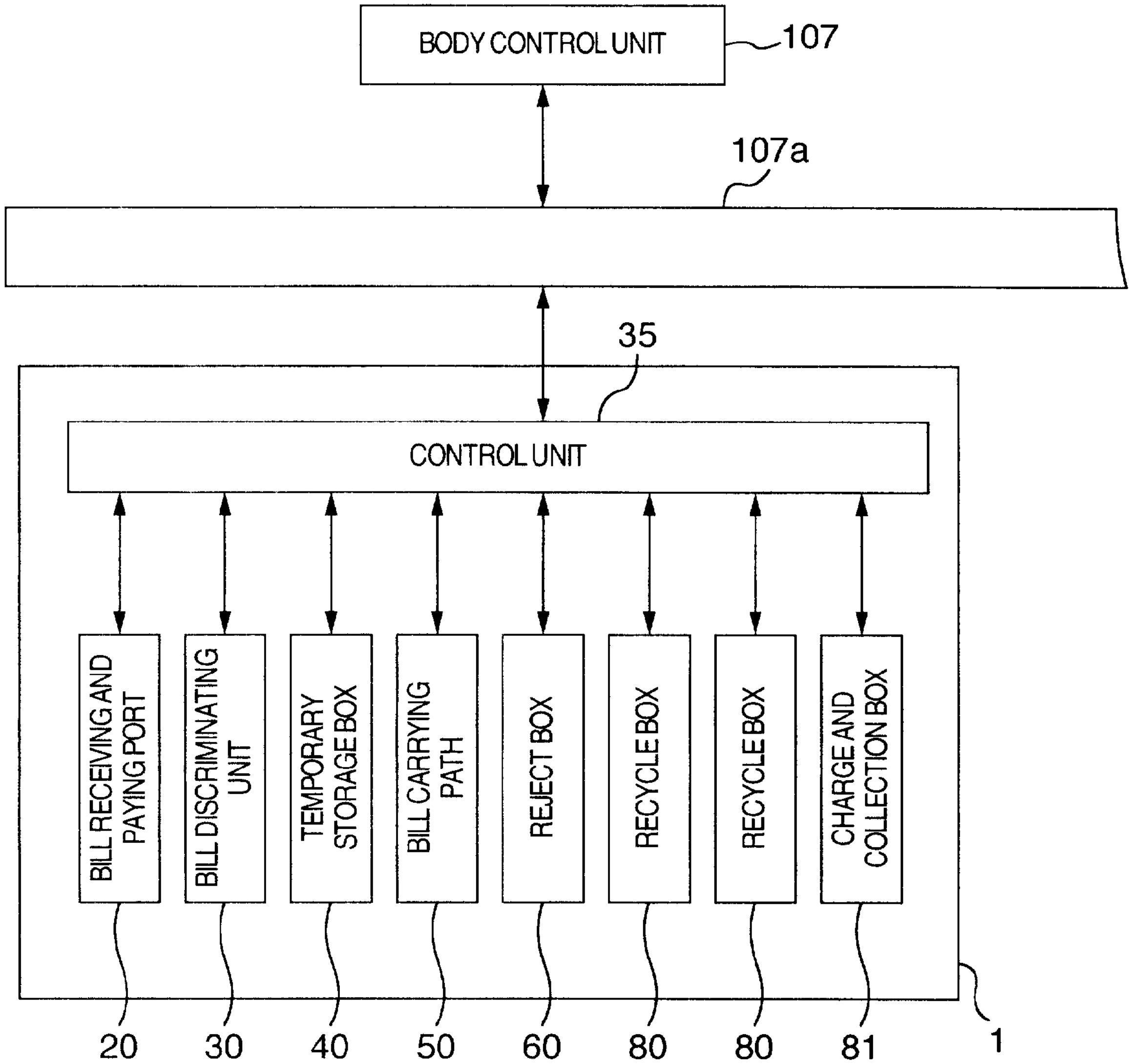
FIG. 4 is a block diagram useful in explaining the control relation of the bill recycle machine.

As shown in FIG. 4, a control unit 35 is electrically connected to the body control unit 107 of the bill recycle machine 1 through the bus 107*a* and in response to a command issued from the body control unit 107 and the detection of the state of the bill recycle machine 1, controls the bill recycle machine 1, and also if necessary, sends the information relating to the state of the bill recycle machine 1 to the body control unit 107. In the bill recycle machine 1, the control unit 35 is electrically connected to a drive motor, an electromagnetic solenoid and a sensor (for the bill receiving and paying port 20, the bill discriminating unit 30, the temporary storage box 40, the bill carrying path 50, the reject box 60, the recycle box 80, and the charge and collection box 81) and in accordance with the dealings, drives and controls an actuator while monitoring the state of the sensor.

The bill recycle machine 1, as shown in FIG. 3, includes: a upper carrying mechanism 1*a* having the bill receiving and paying port 20, the bill discriminating unit 30, the temporary storage box 40, and the bill carrying path 50; and a lower bill mechanism 1*b* having the reject box 60, the recycle box 80, the charge and collection box 81 and the bill carrying path 90 which is provided in the front of the accommodating boxes and for which opening and closing can be carried out. In this connection, in the figure, the control unit 35 is omitted.

Figure 5A:
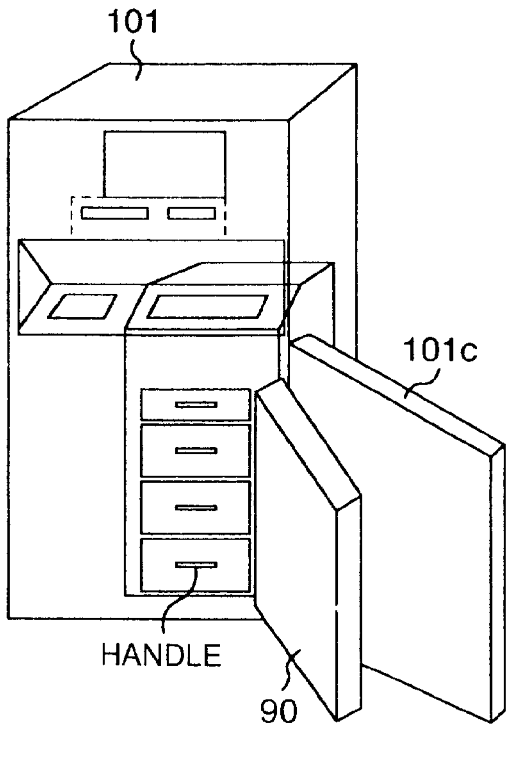
FIGS. 5A and 5B are views useful in explaining the method of manipulating the cash automatic teller machine.

The bill recycle machine 1 which is constructed in such a manner as described above, as shown in FIG. 1, is mounted to the lower-side inner part of the cash automatic teller machine 101. In accordance with the type of the bill recycle machine, either the front manipulation type machine or the back manipulation type machine can be adopted. In this case, the construction of the former differs slightly from that of the latter. As shown in FIG. 5A, in the case of the front manipulation type machine which is manipulated from the front of the machine by a foreman, the machine is constructed in such a way that a front door 101*c* of the machine can be opened and closed. Then, as shown in the figure, if the front door 101*c* is opened and then a closing bill carrying path 90 of the bill recycle machine 1 is opened, then the bill accommodating boxes each having a handle appear. Then, a foreman holds the associated one(s) of the handles to pull out the associated one(s) of the bill accommodating boxes so that the manipulations such as the charge and collection of the bills, and other maintenance works can be carried out.

Figure 5B:
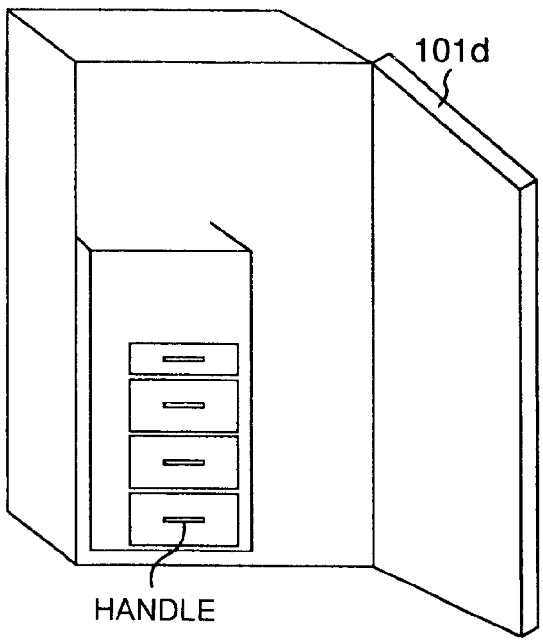

On the other hand, as shown in FIG. 5B, in the case of the back manipulation type machine which is manipulated from the back of the cash automatic teller machine 1 by a foreman, the machine is constructed in such a way that a back door 101*d* of the machine can be opened and closed. Then, as shown in the figure, if the back door 101*d* is opened, then the bill accommodating boxes each having a handle appear. Then, a foreman holds the associated one(s) of the handles to pull out the associated one(s) of the bill accommodating boxes so that the manipulation can be carried out by a foreman.

As described above, the construction is adopted in which the closing bill carrying path 90 is provided in the vicinity of the front door or the back door of the lower bill mechanism which is arranged on the lower side of the bill recycle machine 1, whereby the operation of filling and collecting the bills, and the operation of removing the jamed bills when the abnormality has occurred become easy to be carried out so that the operationability is enhanced. In addition, only by providing the closing door in either the front or the back, this construction is adopted to either the front manipulation type machine or the back manipulation type machine for the foreman manipulation.

In addition, the bill carrying path 50 (refer to FIG. 3) passes bidirectionally the bill discriminating unit 30. Then, the bill receiving and paying port 20, the temporary storage box 40, the reject box 60, the recycle boxes 80, and the charge and collection box 81 are mechanically connected to one another via bill carrying paths which are respectively indicated by arrows 501*a* to 501*j*, 901*a* to 901*c*, 902*a* to 902*d* and 904*a* to 904*b*. Out of the arrows, each of one-way arrows indicates the one-way bill carrying path through which the bills are carried along the one-way arrows, while each of two-way arrows indicates the bidirectional bill carrying path through which the bills, by switching the bill carrying direction over to one of the bidirection are carried every operation for the dealings.

Figure 6:
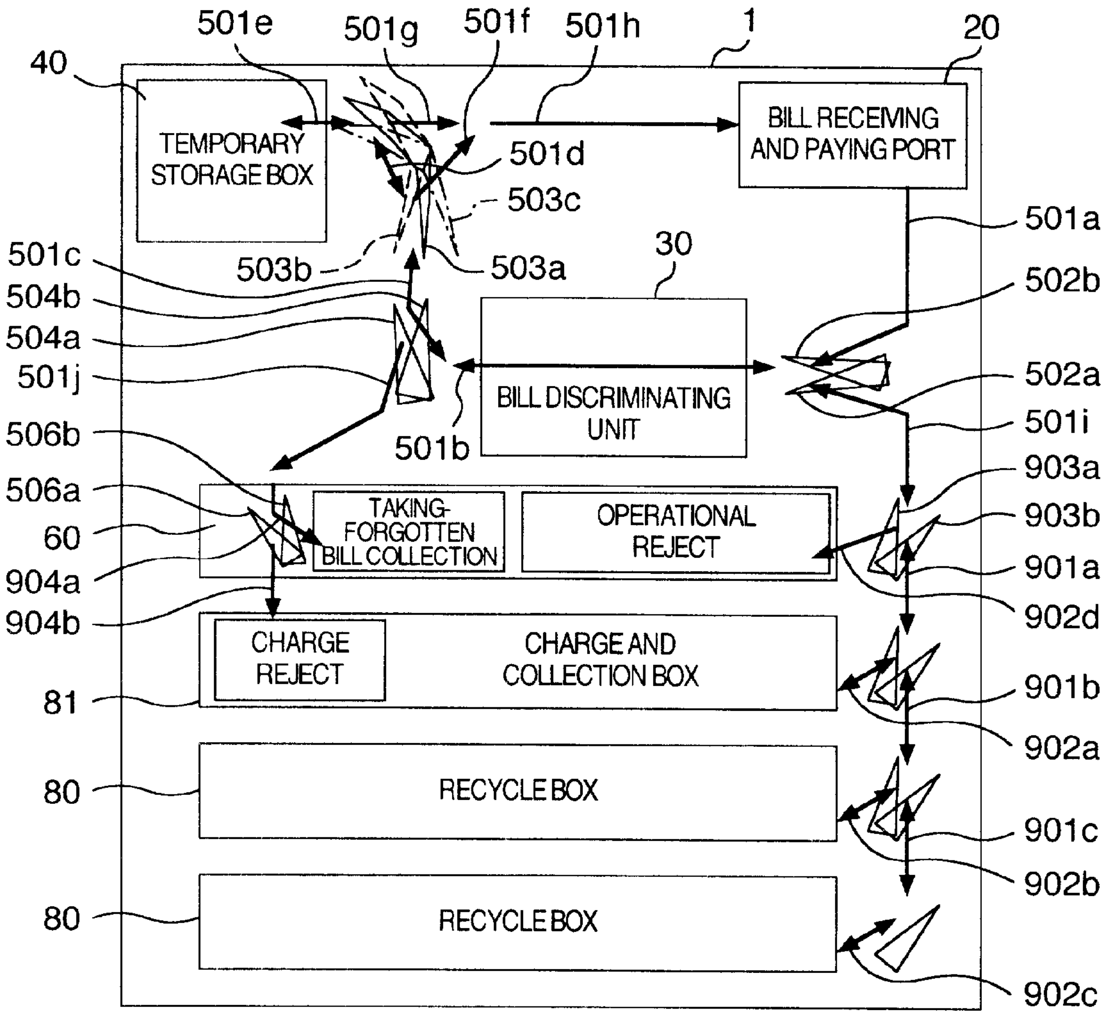
FIG. 6 is a schematic view showing the construction of a bill carrying path (part 1)

FIG. 6 shows schematically the relation of the units 50 of FIG. 3 (20, 30, 40, 60, 80 and 81) and the bill carrying paths 50 of FIG. 3 (501*a* to 501*j*, 901*a* to 901*c*, 902*a* to 902*d*, and 904*a* to 904*b*). These bill carrying paths 50 are driven by a drive motor (not shown), and the rotational direction of the drive motor is switched every operation for the dealings. In addition, switching gates 502, 503, 504 and 505, and three switching gates 902 are provided in the branch points of the bill carrying paths 50, and the bill carrying direction is switched as indicated by the symbol a, b or c every operation for the dealings.

The lower bill mechanism 1*b* (refer to FIG. 3) which is arranged in the lower side of the bill recycle machine includes the reject box 60, the recycle box 80, the charge and collection box 81, and the three bill carrying paths 901*a* to 901*c* and 902*a* to 902*c* in the front of these boxes of the bill carrying paths 50 to constitute a closing bill carrying path which is constructed in such a way as to be able to be opened and closed integrally. In the front manipulation type machine shown in FIG. 5A, a foreman opens the closing bill carrying path 90 to carry out the manipulation for the reject box 60, the recycle boxes 80 or the charge and collection box 81.

Before describing the operation for each of the dealings shown in FIGS. 7 to 16, the details of the above-mentioned units (20, 30, 40, 60, 80 and 81) will hereinbelow be described in detail with reference to FIGS. 17 to 21.

Figure 17:
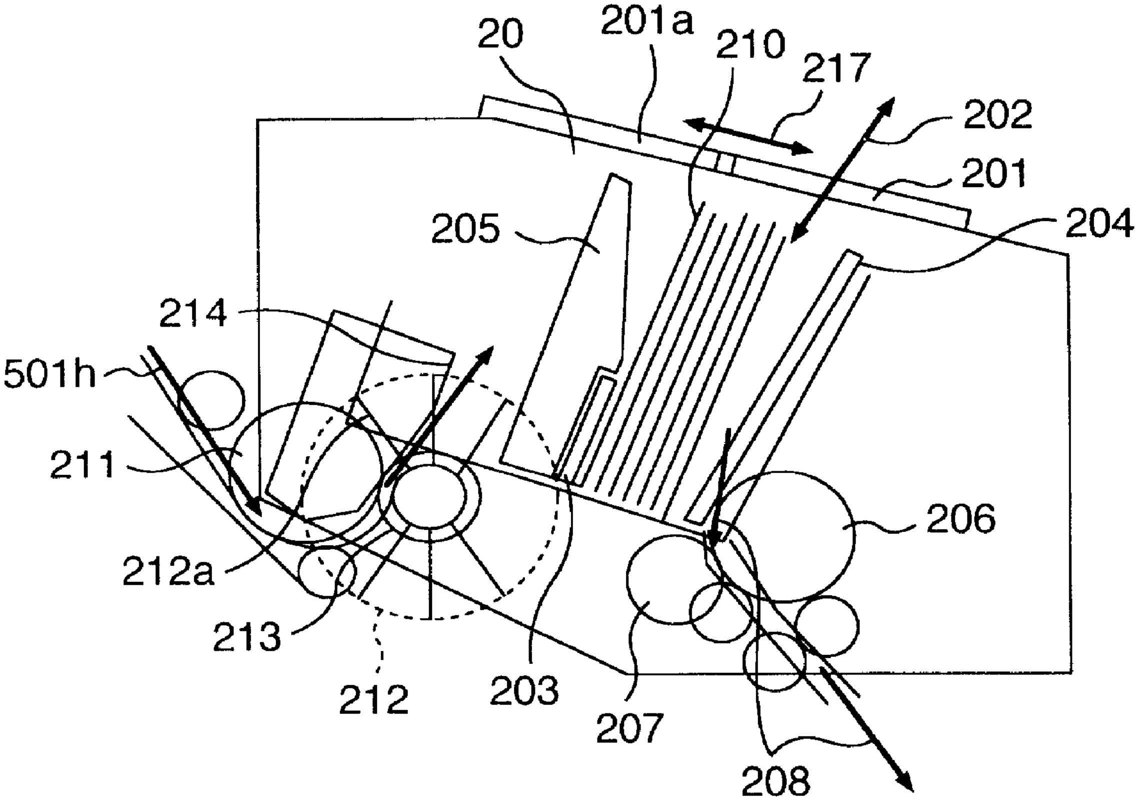
FIG. 17 is a side elevational view showing the construction of a port through which the bills are received and paid.

The bill receiving and paying port 20, as shown in FIG. 17, has a shutter 201. Then, the shutter 201 is slided in the direction indicated by an arrow 217 to be opened and closed, and thus is moved to a state 201*a* shown in the figure to be opened and under this state, a user takes out the bills when payment of the bills has been carried out, while casts the bills thereinto when carrying out the receipt of the bills in a direction indicated by an arrow 202 shown in the figure.

When intending to receive the bills from a user during the dealings of receipt of the bills, the shutter 201 is opened to provide the state in which the bills 210 can be cast into the space defined between a front plate 204, a press plate 203 and a back plate 205. Next, in the operation of sending the bills which have been received, the shutter 201 is closed and then the bills 210 are pressed against a feed roller 206 by the press plate 203 to be sent out on the basis of the rotational operation of the feed roller 206 and also the two-sheets sending is prevented by a gate roller 207 which is not rotated in the sending direction. In such a manner, the bills 210 which have been cast into the bill receiving and paying port 20 are sent in a direction indicated by an arrow 208 to meet with each other through the bill carrying paths 50 to be taken into the bill recycle machine.

In addition, the bills which have been paid from the inside of the machine, or the bills which have been rejected from the reason that they have not been able to be discriminated when received them are carried along a direction indicated by an arrow 501*h* from the inside of the machine to be sent between a rotating stack roller 211 and a backup roller 213. A brush roller 212 is alinged with the backup roller 213 through an axis around which elastic members 212*a* are radially arranged as shown in the figure, and is rotated independently of the backup roller 213 by a drive source (not shown). The bills which have been sent between the stack roller 211 and the backup roller 213 come into contact with the elastic members 212*a* of the stopped brush roller 212. Then, the bills pass along a stack guide 214 while suffering the frictional resistance which is generated between the bills and the stack guide 214 by the elastic deformation force of the elastic members 212*a* and then are stopped temporarily at the bill position where the bills become free from the sandwiching carry force generated between the stack roller 211 and the backup roller 213. Then, right after the temporary stopping of the bills, the brush roller 212 is rotated, and then the bills are accommodated in the space defined between the press plate and the back plate. As a result, it becomes possible for a user to take out readily the bills only by raking horizontally the bills using the brush roller 212 without the bills flaying out upwardly and without the continuously carried bills being interfered with one another with the less vertical misalignment. Next, the shutter 201 is opened so that the bills which have been accommodated in a bill hopper 216 are discharged to a user.

Referring now to FIG. 3 again, while the details are not illustrated, the bill discriminating unit 30 includes: a two sheets detection unit for detecting the displacement of one pair of rollers when the bills are being carried between the one pair of rollers to determine whether or not the bills overlap each other by two sheets; and a distinguishment unit for detecting the printing and the like of the bills using an image sensor or the like to discriminate the kinds of bills and whether or not the bill of interest is proper (the authenticity). Thus, the bill discriminating unit 30 informs the control unit 35 of the results of discriminating the passed bills.

The temporary storage box 40 (refer to FIG. 3) accommodates therein successively the bills which have been received through the bill receiving and paying port 20 in the dealings of the receipt of the bills and the kinds of which have been decided in the bill discriminating unit 30 and then reserves temporarily the bills until the dealings have been established and after the establishment of the dealings, discharges successively the bills. The temporary storage box 40 has the function as has been just described above. In addition, while the details will be described later, in the present embodiment, the reject bills the kinds of which are not decided in the bill discriminating unit 30 in the dealings of the payment of the bills are accommodated and then are temporarily reserved until the operation of the payment of the bills has been completed, and after completion of that operation, are discharged in the operation of accommodating the paid reject bills. The present embodiment has such a function as has been just described above.

Figure 18:
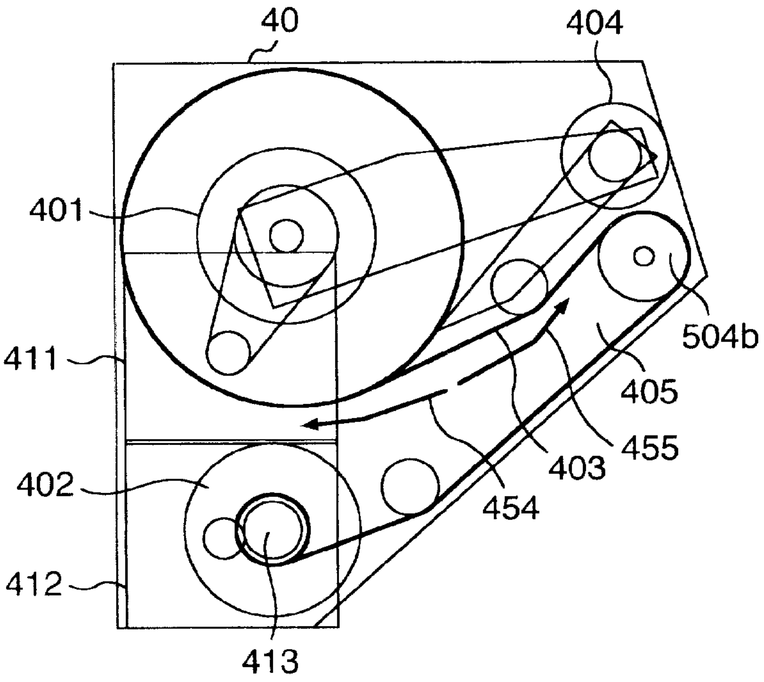
FIG. 18 is a schematic view showing an example of the construction of a temporary storage box.

This construction, as shown in FIG. 18, is constituted by: a guide tape 403 which is made of plastic; a rotating drum 401 for rolling therearound the bills which have been carried with the aid of the guide tape 403; a rolling axis 402 for rolling therearound only the guide tape 403; an inlet port roller 405 for guiding of the bills in such a way that the bills approach the rotating drum 401 and also rotating together with the guide tape 403; and a backup roller 404 which is provided opposite thereto. A rotating drum 401 and a rolling axis 402 which support the both ends of the guide tape 403, respectively, are electrically connected to individual drive sources 411 and 412, respectively. In this connection, on the rolling axis 402 side, the rolling axis 402 is mechanically connected to the drive source 412 through a torque limiter 413.

In addition, the construction may also be adopted in which an initial position sensor (not shown) for detecting an initial position of the guide tape 403, and a near-full sensor (not shown) for detecting the near-end of the guide tape 403 are both provided, and an encoder (not shown) for detecting the current amount of rolling of the guide tape 403 is attached to the inlet port roller 405 with the initial position of the guide tape 403 as the reference, and the control for the timing or the like is carried out in the control unit 35 using these signals. In addition, a temporary storage box passing sensor may may be attached onto the bill carrying path on the rolling drum 401 side with respect to the inlet port roller 405.

Before the accommodating operation, the guide tape 403 is rolled up to the initial position on the rolling axis 402 side. In the case where the bills to be accommodated are temporarily accommodated in the temporary storage box 40, the drive source 411 is driven in the direction along which the rotating drum 401 rolls therearound the guide tape 403 to rotate the rotating drum 401 in such a way that the travelling speed of the guide tape 403 becomes roughly equal to the approach speed of the bills, and then the received bills which have been carried is successively rolled by the rotating drum 401 via an arrow 454. On the other hand, the rolling axis 402 is driven through a torque limiter 413 by the drive source 412 in such a way as to apply the tension to the guide tape 403 and hence the guide tape 403 is rolled together with the bills by the rotating drum 401 without being slack off.

In the discharging operation, the rotating drum 401 is rotated reversely and also the rolling axis 402 is reversely rotated in the rolling direction. Thus, the bills are sent in the reverse order to the bill accommodating operation to the bill carrying path 50 via an arrow 455 while applying the tension to the guide tape through the torque limiter.

Figure 19:
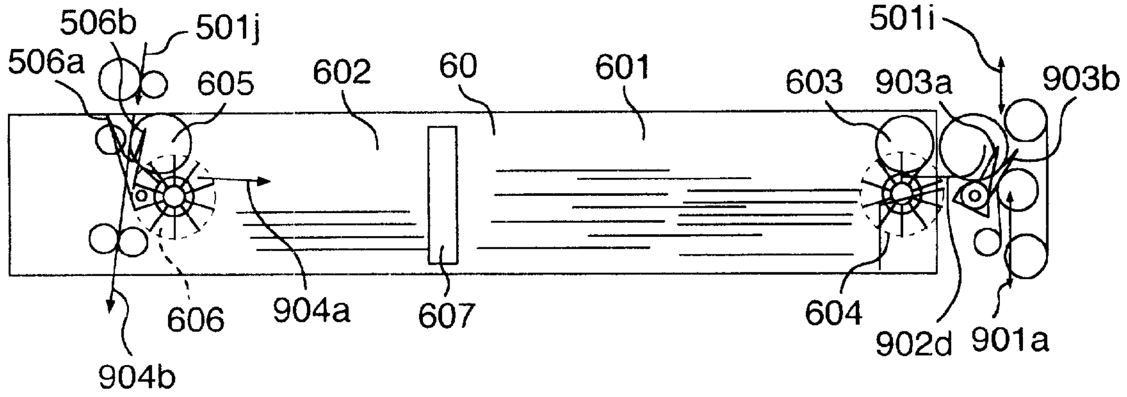
FIG. 19 is a side elevational view showing the construction of a reject box.

The reject box 60, as shown in FIG. 19, has the two front and back bill accommodating units 601 and 602 which are provided by partitioning it using a partition plate 607. The front bill accommodating unit 601 has the stack mechanism which is constituted by: a stack roller 603 which is driven by a drive source (not shown) provided outside the reject box 60 through a gear to be rotated; and a brush roller 604 which faces the stack roller 603 and around which elastic members are radially arranged as shown in the figure. The bills to be accommodated in the front bill accommodating unit 601, by switching the state of a switching gate 903 over to the state 903*b* as shown in the figure, are carried in a horizontal direction indicated by an arrow 902*d* to be accumulated therein.

The back accommodating unit 602 has: a stack mechanism which is constituted by a rotating stack roller 605 which is driven by a drive source (not shown) provided outside the reject box 60 through a gear and a brush roller 606 which faces the stack roller 605 and around which elastic members are radially arranged as shown in the figure; a switching gate 506; and a bill carrying path which is travelled in a direction indicated by an arrow 904*a* by the switching gate 506. The bills to be accommodated in the back bill accommodating unit 602, by switching the state of the switching gate 506 over to the state 506*a* shown in the figure are horizontally carried from the bill carrying path (indicated by an arrow 501*j*) in a direction indicated by an arrow 904*a* to be accumulated therein.

In the present embodiment, as will be described later, the front bill accommodating unit 601 accommodates therein, in the dealings of receipt of the bills, the bills which are not accommodated in any of the recycle boxes 80 (which are not used for the payment) (referred to as "the non-circulating bills" for short, when applicable), the bills the kinds of which can not be discriminated by the distinguishing unit in the dealings of payment of the bills; and the bills each of which has been abnormal in the bill carrying state. This unit is referred to as the operational reject accommodating unit. On the other hand, the back bill accommodating unit 602, when a user forgets to take out the bills which have been paid in the bill receiving and paying port 20, in order to continue the dealings for a next user, accommodates therein the bills which have been forgotten to be taken out by a user. This unit is referred to as the taking-forgotten bill collecting unit.

The operational reject accommodating unit has the space in which about 500 sheets of bills can be accommodated, and the taking-forgotten bill collecting unit has the space in which about 200 sheets of bills can be accommodated. A partition plate 607 is arranged in such a way as to fulfill the ratio of capacity of the two accommodating units, i.e., in such a way that the space of the front accommodating unit becomes wider. If the partition plate 607 is designed in such a way as to be adjusted variably with the position thereof, this can cope with the various applications in accordance with the object of the bills to be accommodated.

Figure 20:
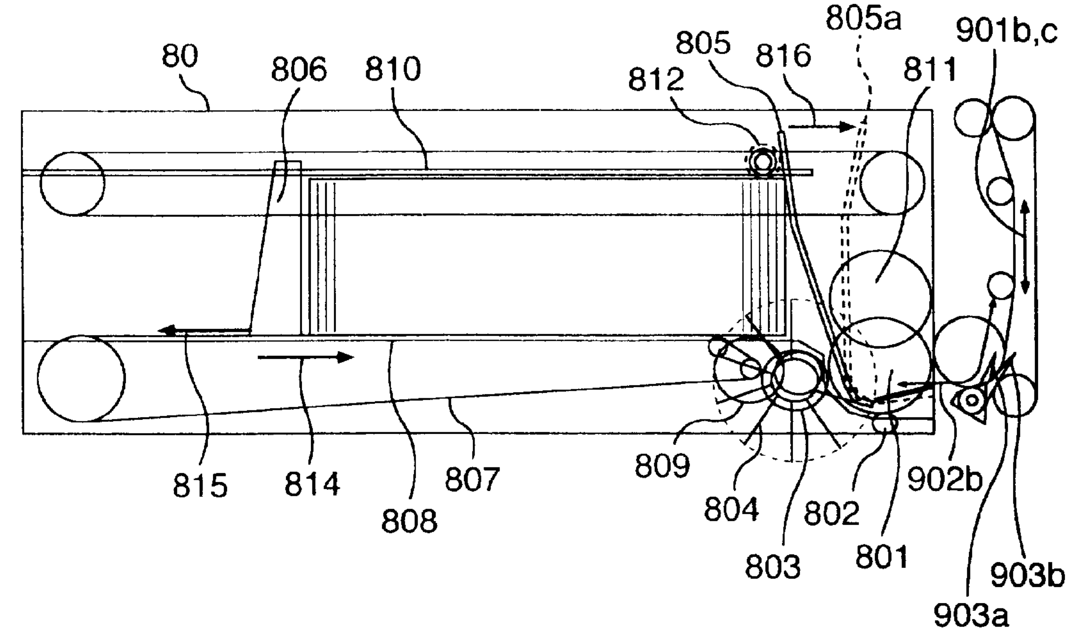
FIG. 20 is a side elevational view showing the construction of a recycle box.

Two recycle boxes 80 are mounted in the present embodiment, and the construction thereof is shown in FIG. 20.

Each of the recycle boxes 80 is the bill accommodating box in which the accommodation and separation sending of the bills can be carried out. In this connection, the stack and separation mechanism is constituted by: a stack feed roller 801 and a pickup roller 811 which are driven by a drive source (not shown) provided outside each of the recycle boxes through a gear to be rotated; a backup roller 802 which is rotated; a gate roller 803 which is rotated in the stack direction, but is not rotated in the bill sending direction; a brush roller 804 which is aligned with the gate roller 803 along the axis around which elastic members are radially arranged; and a separation and stack guide 805 which is activated in the stack as well as in the separation.

The bills are accommodated in the bill accommodating space defined among a bottom plate 808, a press plate 806, a bottom flat belt 807 which is stretched in such a way as to support the lower faces of the bills on the upper face thereof with respect to the bottom plate 808, and the separation and stack guide 805. In addition, the stack and separation mechanism includes: a rotating upper bill raking roller 812 which has a sawtooth-like peripheral shape in the vicinity of the separation and stack guide 805 provided in the upper part of the bill accommodating unit, and a rotating lower bill raking roller 809 which has a sawtooth-like peripheral shape in the vicinity of the gate roller 803 provided in the lower part of the bill accommodating unit. Thus, the upper and lower end parts of the stacked bills are supported by the sawtooth-like shaped peripheries, and the upright (standing) state of the bills is maintained while raking the bills to the press plate 806 side.

In the separation operation, the separation and stack guide 805 is rotated in a direction indicated by an arrow 816 to be moved to the position indicated by a broken line 805*a,* and then the press plate 806 and the bottom flat belt 807, in a body, are moved within the bill accommodating space either in a direction indicated by an arrow 814 or in a direction indicated by an arrow 815 so that the bills being sent moves the accommodated bills in such a way as to apply a predetermined pressing force to the pickup roller 811 by a spring (not shown). Then, the bills which have been pressed against the pickup roller 811 are successively sent through the rotating stack feed roller 801 to be carried one sheet by one sheet in a direction indicated by an arrow 902*b* while preventing the two sheets sending by the gate roller 803 which is not rotated in the sending direction. Then, the state of the switching gate 903 for the bill carrying paths is switched over to the state indicated by an arrow 903*b* to carry bills in a direction indicated by an arrow 901*b* (901*c*).

In the stack operation, the separation and stack guide 805 is moved to the position indicated by a solid line, and then the press plate 806 and the bottom flat belt 807, in a body, are moved within the bill accommodating space by a drive source (not shown) provided outside the boxes. Then, along with the increasing of the accommodated bills, the separation and stack guide 805 is moved in a direction of keeping the accommodated bills at a distance from the separation and stack guide 805 in such a way that the approached bills which have been carried in a direction indicated by an arrow 902*b* and the accommodated bills are not interfered with each other. At this time, the upper raking roller 812 is rotated counterclockwise, while the lower raking roller 809 is rotated clockwise, and the upper and lower end parts of the stacked bills are supported by the sawtooth-like shaped periphery to maintain the upright state of the bills while raking the bills to the press plate 806 side.

Figure 21:
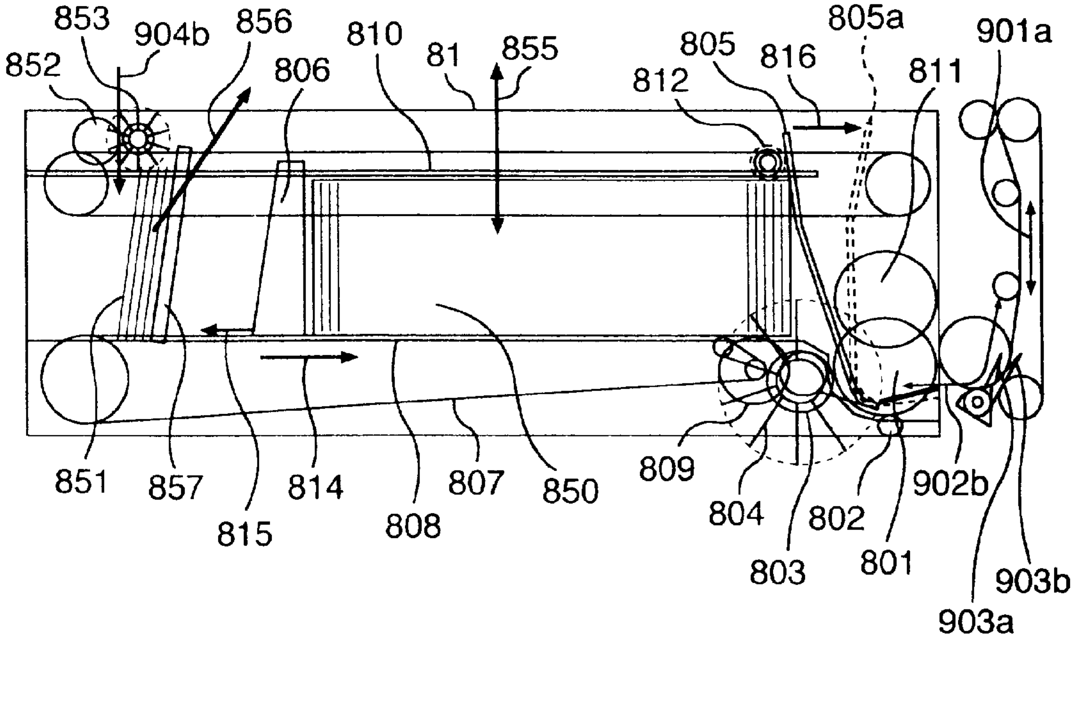
FIG. 21 is a side elevational view showing the construction of a charge and collection box.

The charge and collection box 81, as shown in FIG. 21, has two bill accommodating units, i.e., a charge and collection accommodating unit 850 for charging the recycle boxes with the bills and accommodating therein the bills which have been collected from the recycle box, and a charge reject accommodating unit 851 for accommodating therein the bills with which any of the recycle boxes is not charged.

The charge and collection accommodating unit 850 has the same construction as that of the recycle boxes 80, and carries out the separation operation and the stack operation which are similar to those of the recycle boxes 80. The charge reject accommodating unit 851 has a stack mechanism which is constituted by a rotating stack roller 852 which is driven by a drive source (not shown) provided outside the charge and collection box 81 through the gear, and a brush roller 853 which faces the stack roller 852 and around which elastic members are radially arranged as shown in the figure. The bills which are accommodated in the charge reject accommodating unit 851 are vertically carried from the bill carrying path (indicated by an arrow 904*b*) to be accumulated therein. In order to take out the bills which are accommodated in the charge reject accommodating unit 851, after a upper plate of the charge and collection box 81 has been lifted up to be opened and a wear plate 857 is brought down to the press plate 806 side, the bills are taken out in a direction indicated by an arrow 856. In addition, in order to take the bills in and out from the charge and collection unit 850, after the upper plate of the charge and collection box 81 has been lifted up to be opened, the bills are taken in and out from the charge and collection unit 850 in a direction indicated by an arrow 855.

Next, the description will hereinbelow be given with respect to the operation of the bill recycle machine of the present embodiment with reference to schematic views of FIGS. 7 to 16 (with respect to the detailed construction and reference numerals, refer to FIG. 3).

Figure 7:
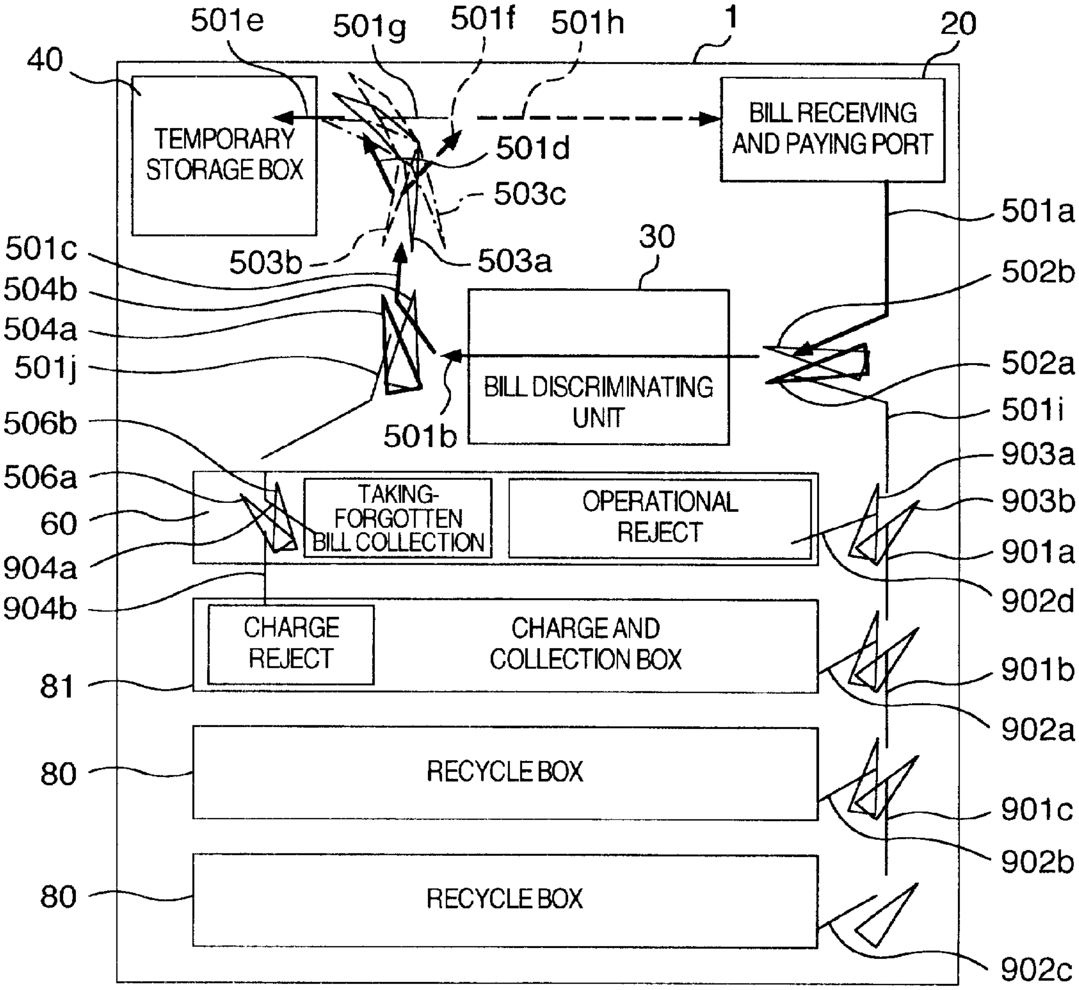
FIG. 7 is a schematic view showing the construction of a bill carrying path (part 2)
Figure 8:
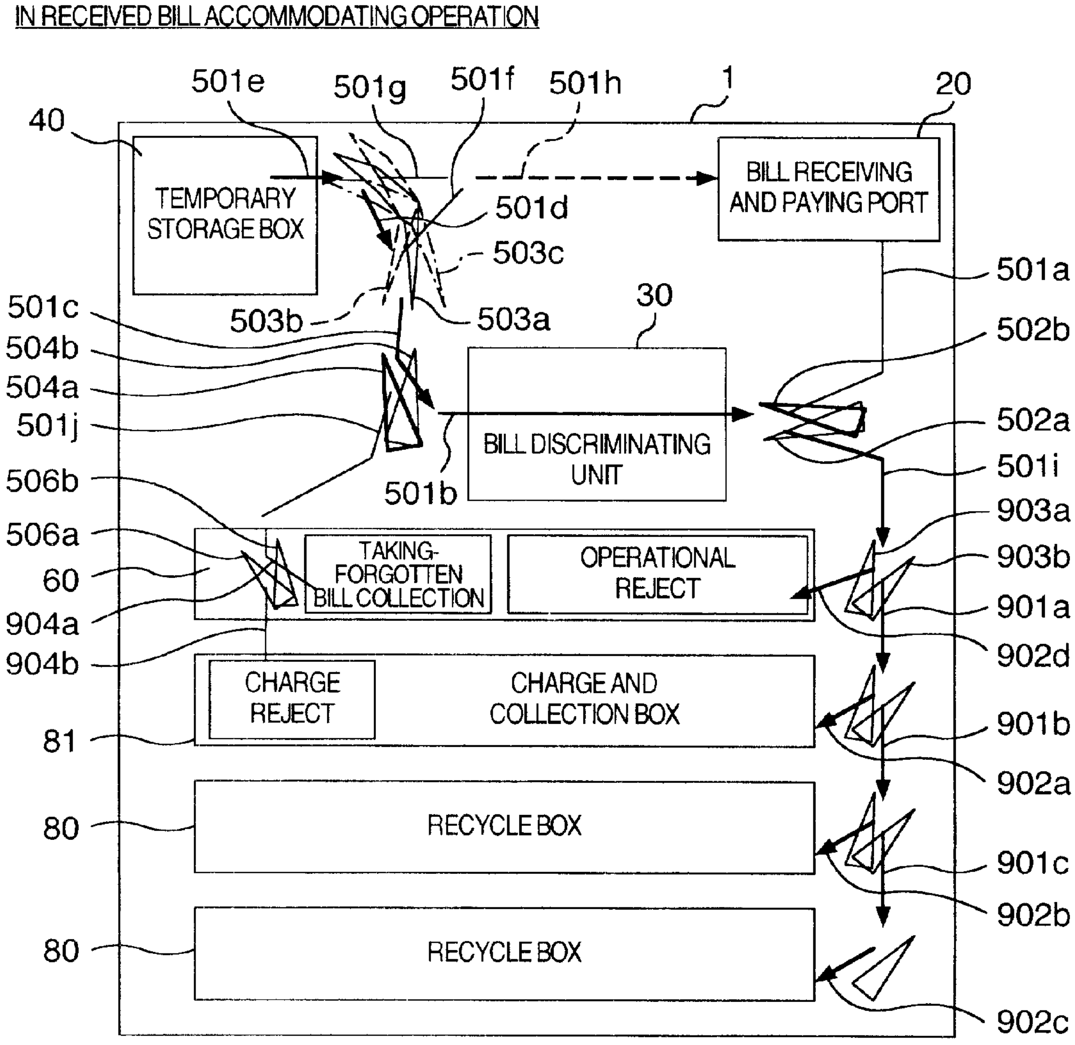
FIG. 8 is a schematic view showing the construction of a bill carrying path (part 3)
Figure 9:
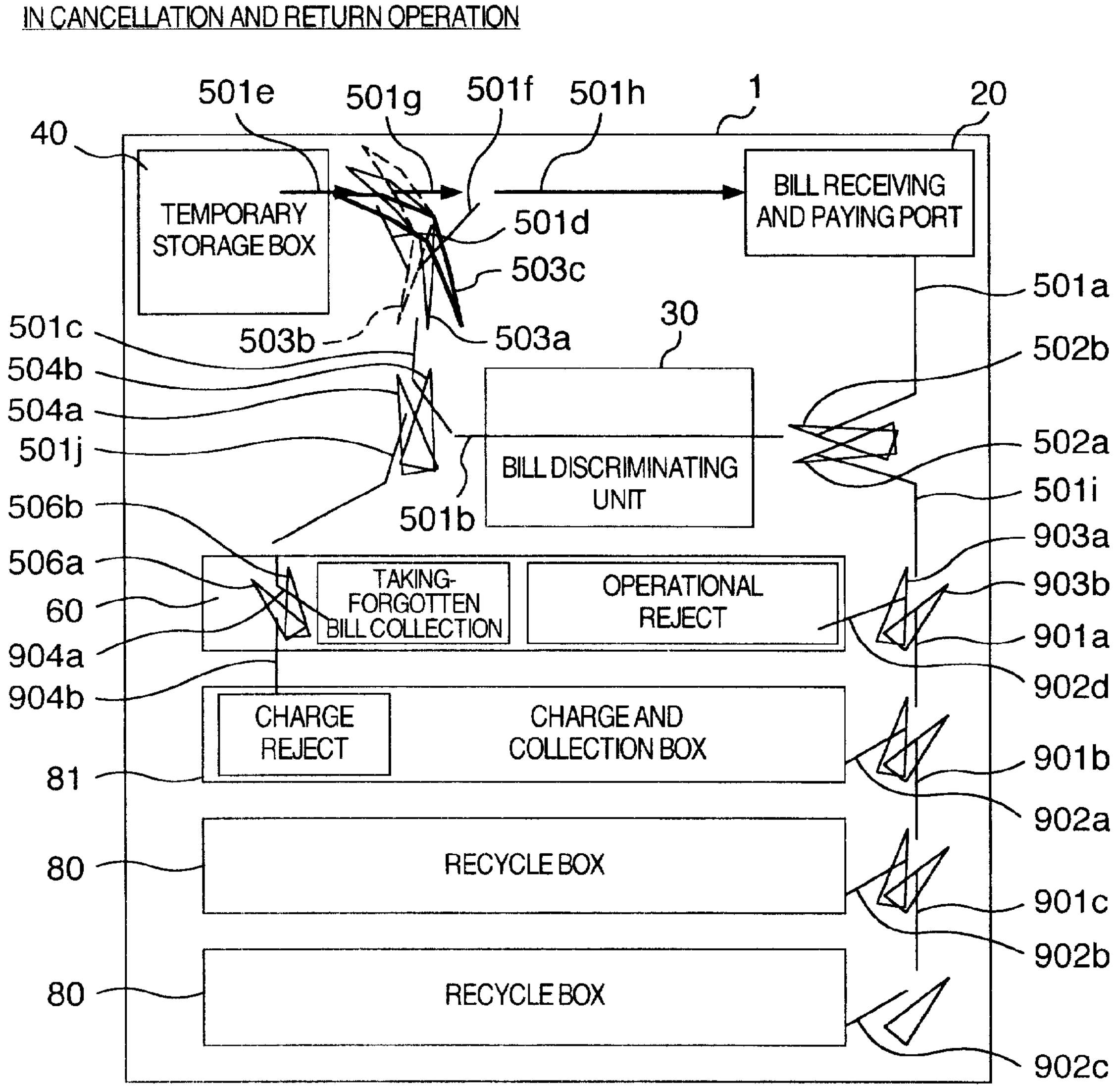
FIG. 9 is a schematic view showing the construction of a bill carrying path (part 4)
Figure 10:
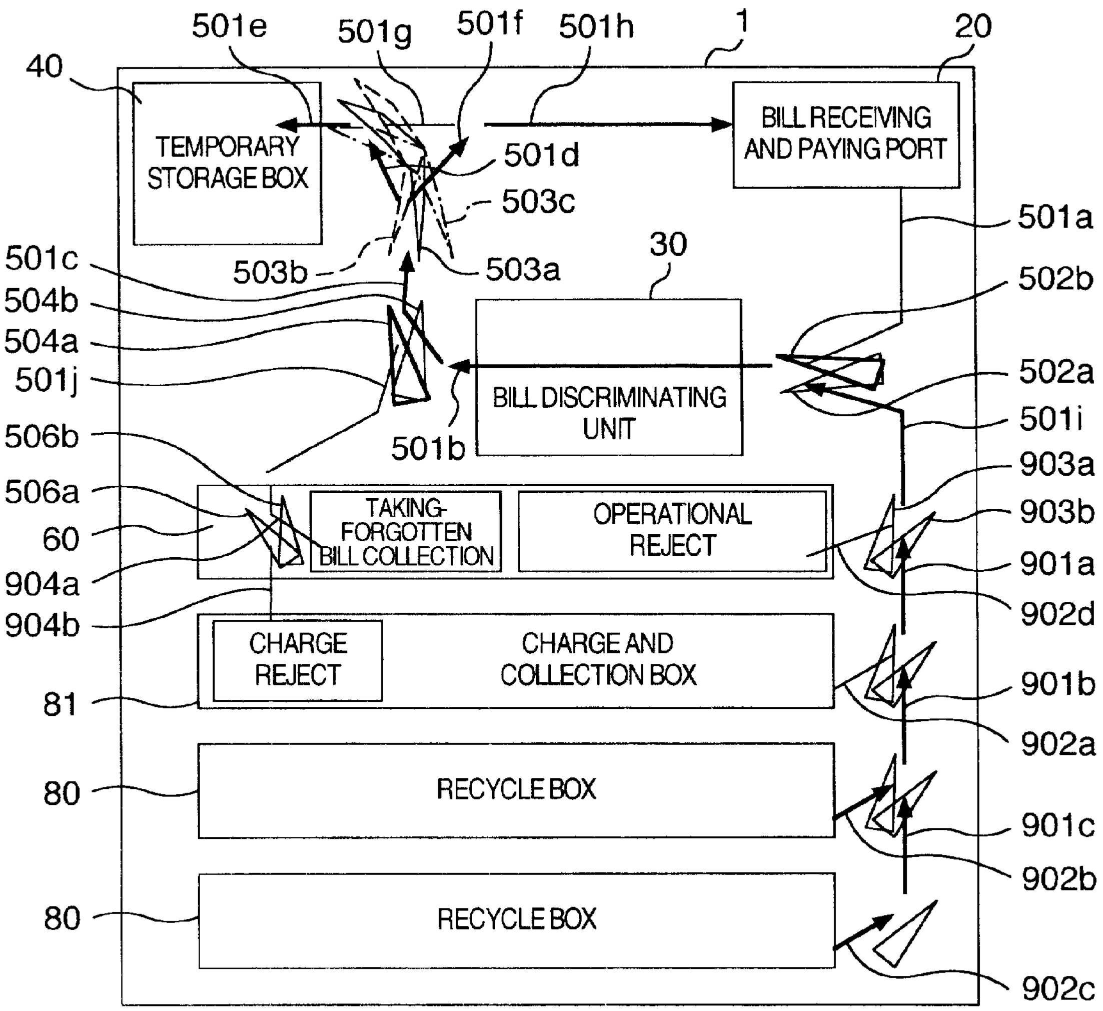
FIG. 10 is a schematic view showing the construction of a bill carrying path (part 5)

The operation in the dealings of receipt of the bills is classified into the received bill counting operation of counting the bills which have been received from a user as shown in FIG. 7, and the received bill accommodating operation of after the confirmation of the counted sum of bills by a user, accommodating the bills in the individual bill accommodating boxes every kind of bills as shown in FIG. 8. In the case where when carrying out the input for the confirmation by a user, the cancellation is selected by a user, the cancellation return operation shown in FIG. 9 is carried out.

In the received bill counting operation (refer to FIG. 7), the bills which have been cast into the bill receiving and paying port 20 are separated one sheet by one sheet and then pass successively through the bill carrying paths indicated by arrows 501*a* and 501*b* so that the kinds of bills and the authenticity are judged in the bill discriminating unit 30. The bills for which the discrimination has been able to be carried out, after the state of the switching gate 503 has been switched over to the state 503*a,* are successively carried from a direction indicated by an arrow 501*c* to directions indicated by arrows 501*d* and 501*e* to be accommodated temporarily in the temporary storage box 40. The bills which have not been able to be discriminated in the bill discriminating unit 30, and the received reject bills which have been determined to be abnormal in the inclination or in the interval between the bills are not taken into the temporary storage box 40, but after the state of the switching gate 503 has been switched over to the state 503*b,* pass successively through the bill carrying paths indicated by arrow 501*f* and 501*h* to be accommodated in the bill receiving and paying port 20 to be returned back to a user.

In the received bill accommodating operation (refer to FIG. 8), a rotating drum 401 of the temporary storage box 40 is rotated in the reverse direction to the accommodation operation, and hence the bills which have been rolled are successively sent in the reverse order to the accommodation operation in directions indicated by the arrows 501*e* and 501*d* and then are successively carried in directions indicated by the arrows 501*c* and 501*b* to pass through the bill discriminating unit 30. Then, by switching the state of the switching gate 502 over to the state 502*b* shown in the figure, the bills pass successively in directions indicated by the arrows 501*i* and 901*a*, and then by switching the state of the associated one of the switching gates 903 of the recycle boxes 80 and the reject box 60 over to the state indicated by the arrow 903*b* shown in the figure, the bills are accommodated in the specified bill accommodating box.

In this connection, while the procedure may be adopted in which the kinds of bills, the authenticity and the like are discriminated again in the bill discriminating unit 30 to specify the bill accommodating box, alternatively, the means for storing therein the discrimination results of all of the bills when accommodating the bills in the temporary storage box 40 is included in the received bill counting operation, and on the basis of the storage contents, the associated one of the bill accommodating boxes may also be specified. In the latter, the processing time required for the specification of the bill accommodating box can be shortened as compared with the former, and also the parts indicated by the arrows 501*i* and 901*a* of the bill carrying path can be shortened as compared with the former.

In the cancellation return operation (refer to FIG. 9), the rotating drum 401 of the temporary storage box 40 is rotated in the reverse direction to the accommodation operation and by switching the state of the switching gate 503 over to the state 503*c* shown in the figure, the bills which have been rolled are successively carried in the reverse order to the accommodation operation in directions indicated by the arrows 501*e*, 501*g* and 501*h* to be accommodated in the bill receiving and paying port 20 to be returned back to a user.

In the dealings of payment of the bills (refer to FIG. 10), a predetermined sheets of bills are sent from the safe for each kind of bills of the recycle boxes 80 to pass successively through the bill carrying paths indicated by the arrows 901*c*, 901*b*, 901*a* and 501*i* and then the kinds of bills are discriminated in the bill discriminating unit 30 and then by switching the state of the switching gate 503 over to the state 503*b* shown in the figure, the bills are accommodated in the bill receiving and paying port 20 to be paid to a user. In the case where the paid reject bill is generated which have not been able to be discriminated in the bill discriminating unit 30, the bill of interest, by switching the state of the switching gate 503 over to the state 503*b* shown in the figure, is temporarily accommodated in the temporary storage box 40 in the same manner as that in the received bill counting operation. Then, the bill for a shortage is additionally supplied from the recycle boxes 80.

Figure 11:
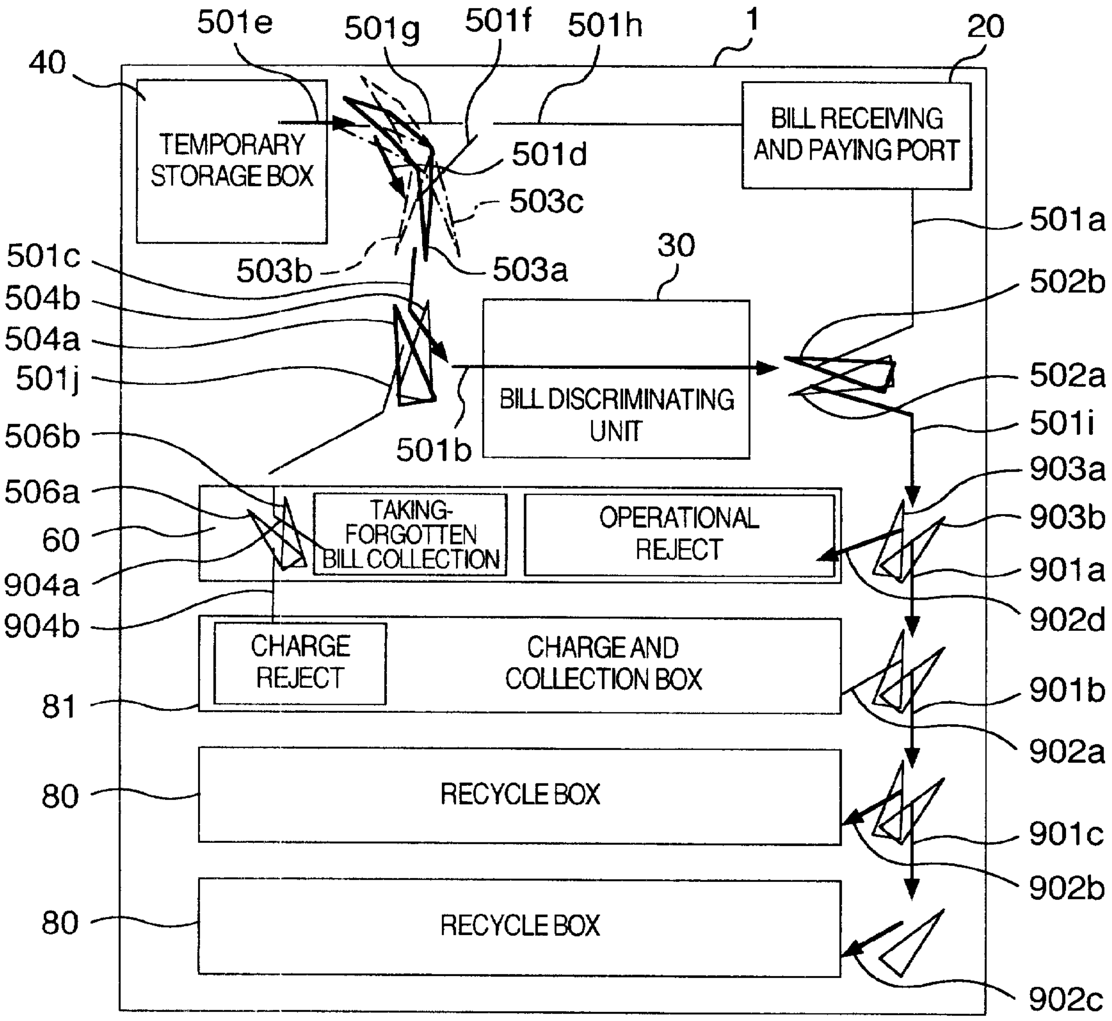
FIG. 11 is a schematic view showing the construction of a bill carrying path (part 6)

In the case where the reject is generated in the dealings of payment of the bills and then is temporarily stored in the temporary storage box 40, the paid reject accommodating operation shown in FIG. 11 is carried out. In the present embodiment, the paid reject bills, as shown in the figure, are successively sent in directions indicated by the arrows 501*e* and 501*d* from the temporary storage box 40 and then are successively carried in directions indicated by the arrows 501*c* and 501*d* to pass through the bill discriminating unit 30 in which the kinds of bills, the authenticity and the like are in turn discriminated again for the paid reject bills. Then, any of the kinds of bills which have not been able to be discriminated and also which have been able to be accommodated in the associated one of the recycle boxes 80 is accommodated in the associated one of the recycle boxes 80, while any of the bills which have not been able to be discriminated is accommodated in the operational reject unit provided in the front of the reject box 60. As a result, the number of sheets of reject bills can be reduced and also the fund efficiency can be improved.

Figure 12:
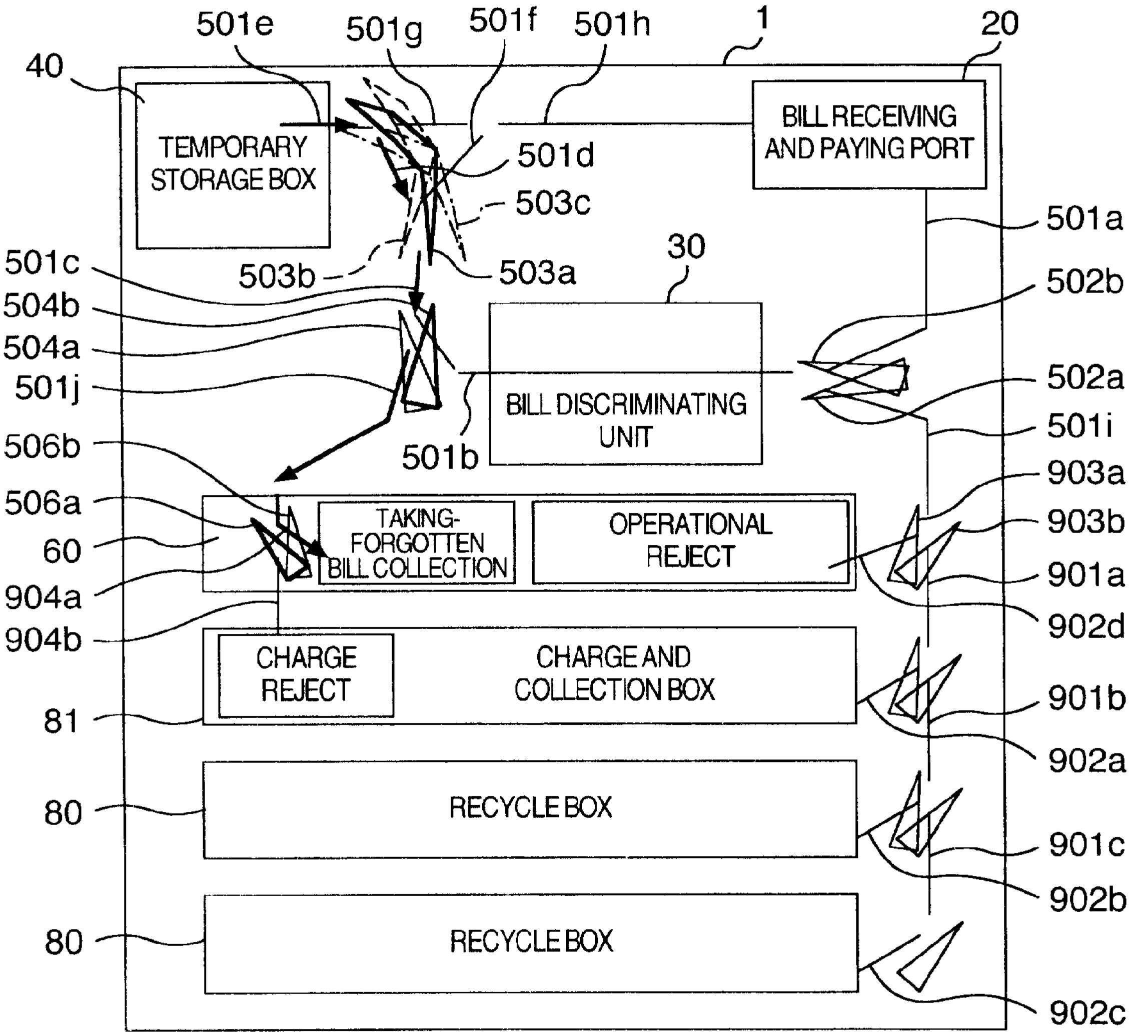
FIG. 12 is a schematic view showing the construction of a bill carrying path (part 7)

In addition, in the case where after completion of the payment of the bills, a user forgets to take out the bills in the bill receiving and paying port 2, the bills are left in the bill receiving and paying port 2 as they are, and then the dealings may be stopped from the reason of the machine abnormality. But, in order to continue the subsequent dealings, in the same manner as that in the received bill counting operation (refer to FIG. 7), after all of the bills which were forgotten to be taken out by a user have been temporarily accommodated in the temporary storage box 40, as shown in FIG. 12, the bills of interest, as shown in the figure, are successively sent in the directions indicated by the arrows 501*e*, 501*d* and 501*c* from the temporary storage box 40 and by switching the states of the switching gates 504 and 506 over to the states 504*b* and 506*a*, respectively, the bills of interest are successively carried out in the directions 501*j* and 904*a* to be accommodated in the taking-forgotten bill accommodating unit dedicated to the taking-forgotten bills which is provided in the back of the reject box 60.

In addition, as shown in schematic views of FIGS. 13 to 16, in the present embodiment, by employing the charge and collection box 81, the operation of charging and collecting the bills is carried out between the associated one of the recycle box 80, and the charge and collection box 81 via the temporary storage box 40.

Figure 13:
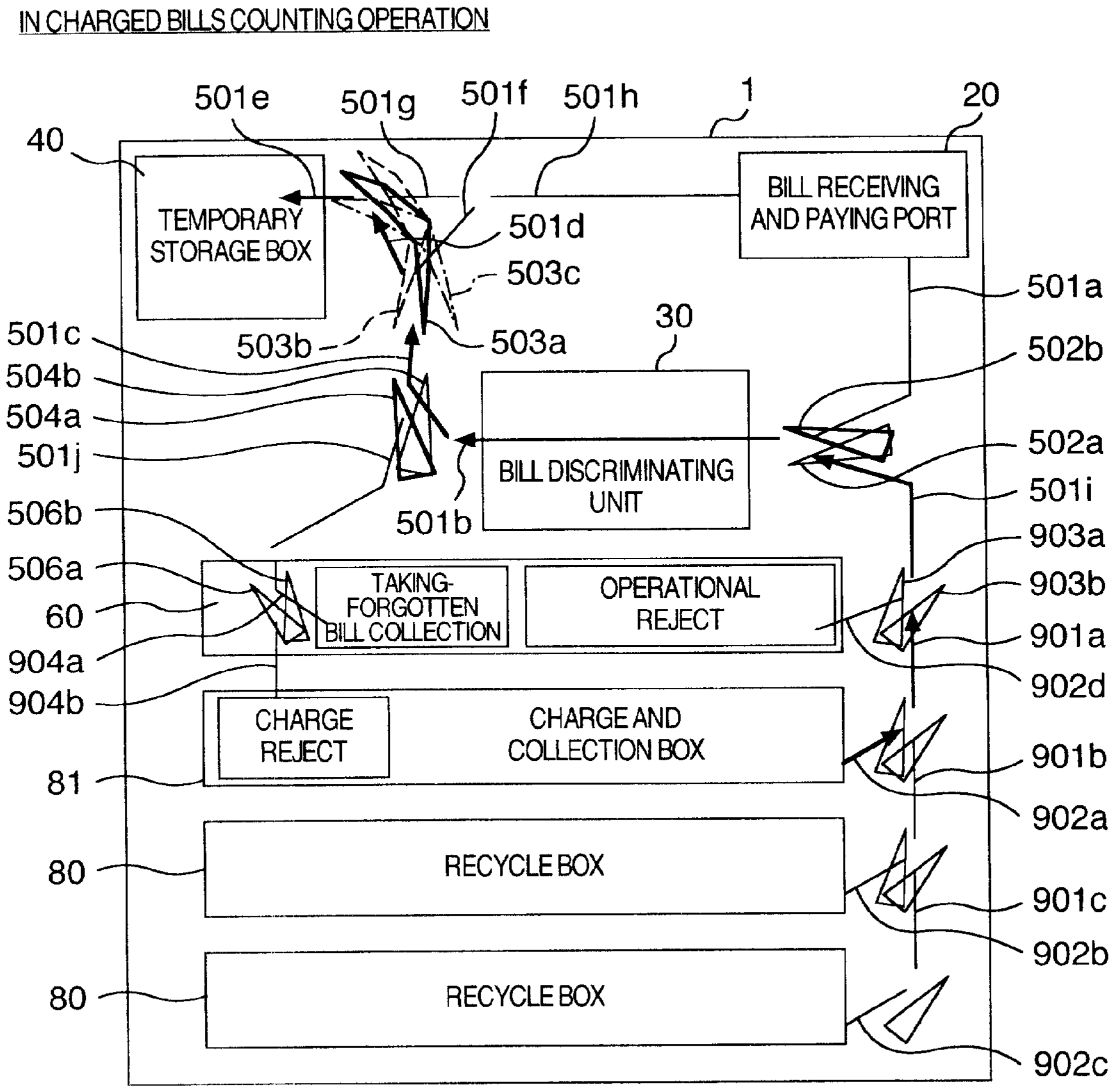
FIG. 13 is a schematic view showing the construction of a bill carrying path (part 8)
Figure 14:
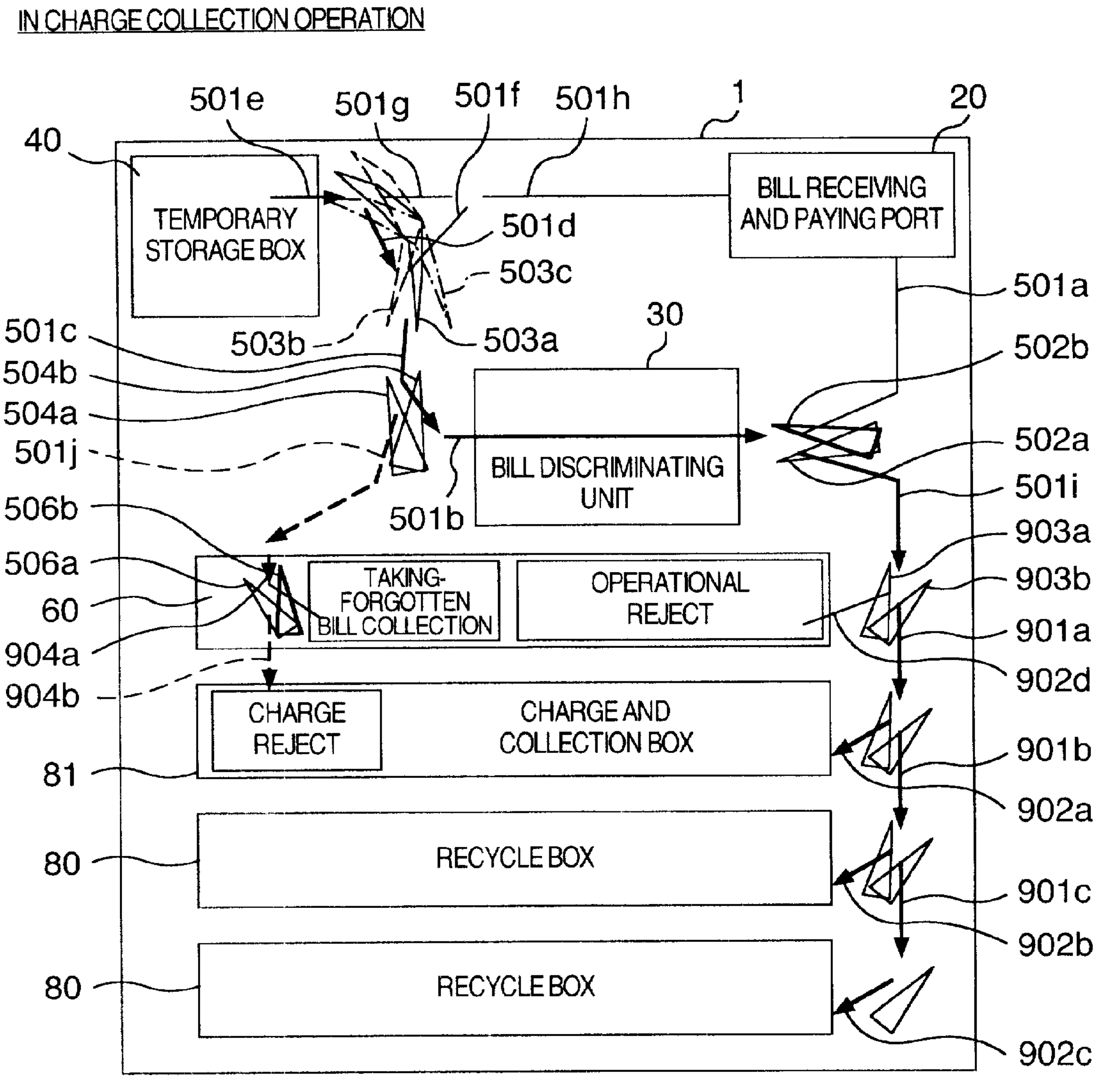
FIG. 14 is a schematic view showing the construction of a bill carrying path (part 9)

The charging operation is not the operation in which the bills which are wanted to be sent every kind of bills are individually set in the associated one of the recycle box 80 by a foreman, but is the operation in which the bills are collectively set in the bill charge and collection box 81 to be accommodated temporarily in the associated one of the recycle boxes 80 within the bill recycle machine. First of all, as shown in FIG. 13, the bills which have been supplied from the charge and collection box 81 in the charge counting operation pass successively through the bill carrying paths indicated by the arrows 901*a*, 501*i* and 501*b* to be sent to the bill discriminating unit 30 in which the kinds of bills are in turn discriminated, and then by switching the switching gate 503, the bills are temporarily accommodated in the temporary storage box 40. Next, as shown in FIG. 14, in the charge and collection operation, the bills are successively discharged from the temporary storage box 40 to be carried through the same bill carrying paths in the reverse direction to be accommodated in the specified ones of the recycle boxes 80 every kind of bills.

Any of the charge reject bills the kinds of which have not been able to be discriminated in the charge counting operation, by switching the states of the switching gates 503 and 506 over to the states 503*b* and 506*b* shown in the figure, respectively, pass successively through the bill carrying paths 501*j* and 904*b* to be accommodated in the charge reject accommodating unit provided in the back of the charge and collection box 81. In this connection, in the case where the number of sheets of bills which have been collectively set in the charge and collection box 81 is larger than the number of sheets of bills which have been able to be accommodated in the temporary storage box 40, the charge and counting operation, and the charge and accommodating operation are repeatedly carried out.

Figure 15:
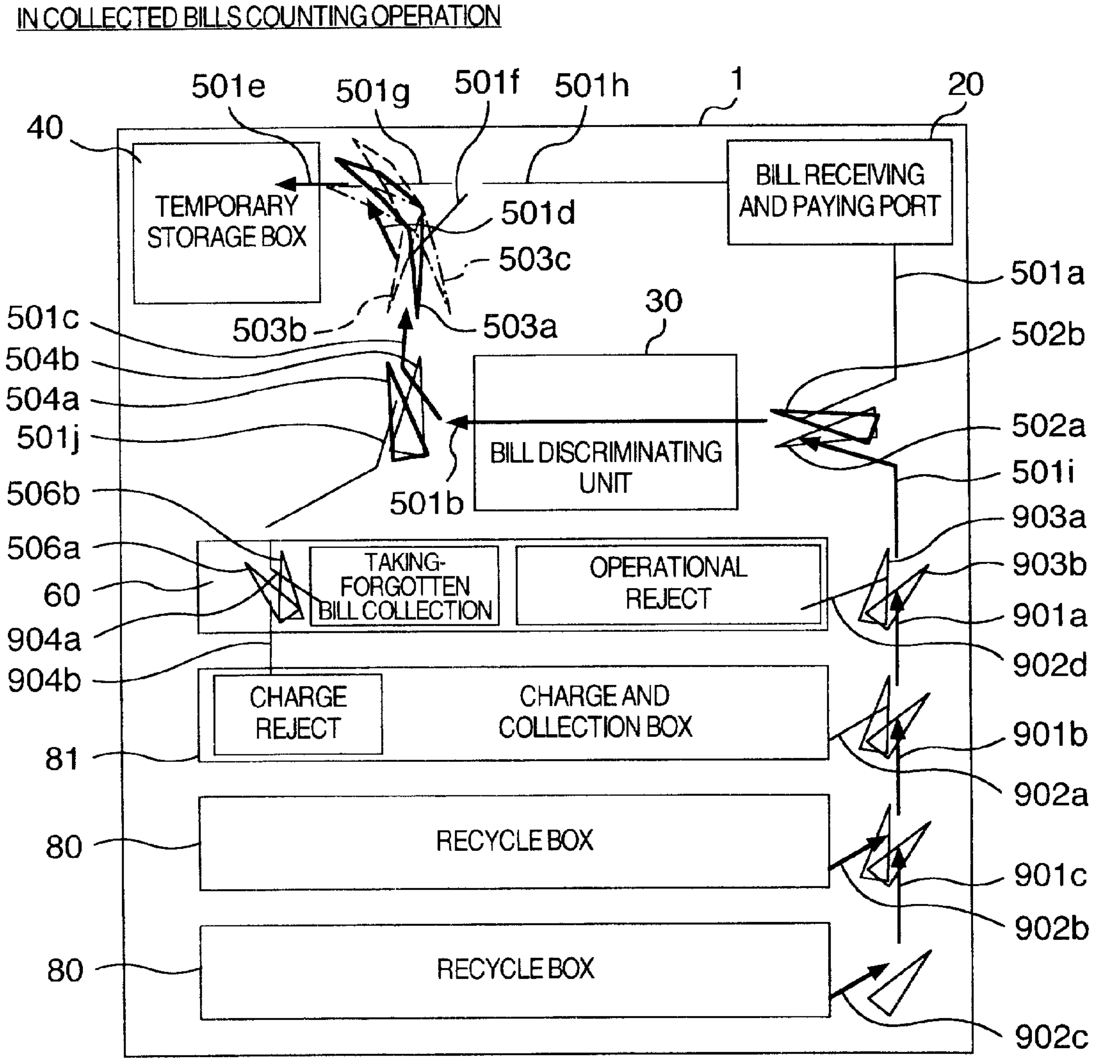
FIG. 15 is a schematic view showing the construction of a bill carrying path (part 10)
Figure 16:
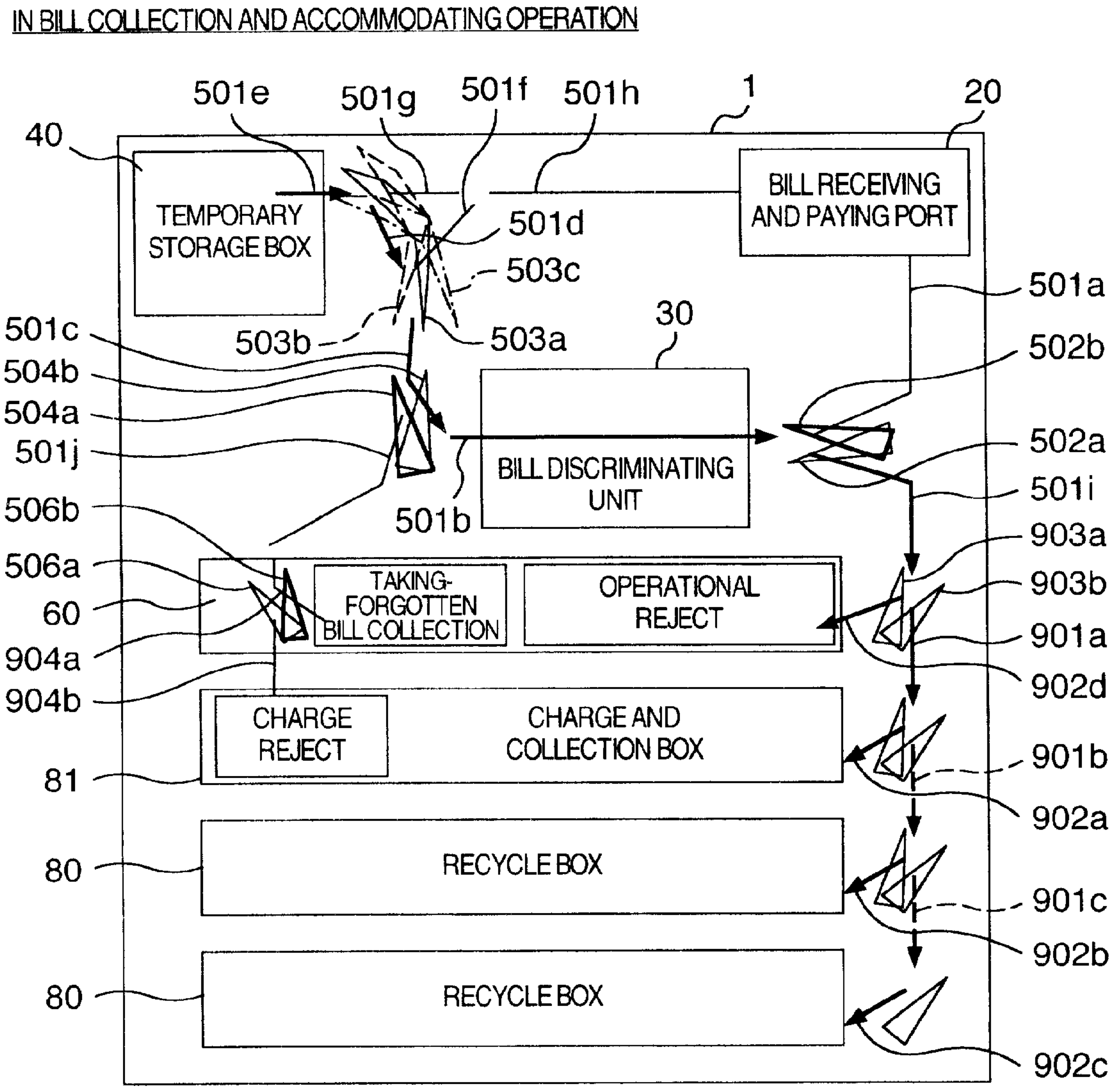
FIG. 16 is a schematic view showing the construction of a bill carrying path (part 11)

The collection operation is not the operation in which when the recycle boxes 80 have been filled with the associated bills and so forth, a foreman draws out individually the bills from the recycle boxes 80, but is the operation in which a predetermined sheets of bills are automatically collected from the recycle boxes 80 to be accommodated in the charge and collection box 81. That is, the collection operation is the operation in which the bills are moved along the reverse route to the charge operation. Thus, as shown in FIG. 15, the bills are temporarily accommodated from the recycle boxes 80 in the temporary storage box 40, and next, as shown in FIG. 16, the bills are collected from the temporary storage box 40 in the charge and collection box 81. The reject bills the kinds of which have not been able to be discriminated in the collection counting operation shown in FIG. 15, or in the collection and accommodating operation shown in FIG. 16, by switching the state of the switching gate 903 over to the state 903*b*, in the collection and accommodating operation shown in FIG. 16, are accommodated in the operational reject accommodating unit provided in the front of the reject box 60.

Next, the description will hereinbelow be given with respect to the main features of the bill recycle machine and the effects which are provided on the basis of the main features.

(1) By adopting the construction in which the bill receiving and paying port and the bill discriminating unit are arranged in the upper part of the bill recycle machine, while the bill accommodating boxes are arranged in the lower part of the bill recycle machine, only the floor space which is occupied by the bill accommodating boxes and the lower bill carrying path is required for the installation space of the bill recycle machine, and hence it is possible to realize the small machine. In addition, while in the present embodiment, only the two recycle boxes are provided, in order to realize a bill recycle machine which has the larger capacity and in which the increased number of kinds of bills can be accommodated, the number of recycle boxes is increased up to three or more. In this case as well, it is possible to realize a small bill recycle machine without increasing the installation space.

(2) The bill carrying path is constructed in such a way that it can be partitioned between the upper and lower mechanisms, and the lower bill carrying path is constituted by the closing bill carrying path 90 which is arranged in the vicinity of the sidewall face on the user manipulation side and the bill carrying paths 904*a* and 904*b* which are arranged in the vicinity of the sidewall face opposite thereto and also in the inside of the reject box 60, so that a bill recycle machine is provided to and from which the bill accommodating boxes can be attached and detached from either the front side or the back side. Thus, the present embodiment can be readily applied to the front manipulation type bill recycle machine which can be manipulated from the front side by a foreman as well as to the back manipulation type recycle machine which can be manipulated from the back side by a foreman as shown in FIGS. 5A, 5B, and hence the bill recycle machine of the present embodiment has the wide application which can cope with the various needs such as the operationability, the installation place and the security.

(3) The bill recycle machine includes, as the unit for accommodating therein the reject bills which have been generated in each of the dealings, the reject box 60 into which the operational reject accommodating unit for accommodating therein the reject bills which have been generated from the reason that the kinds of them have not been able to be discriminated in the bill discriminating unit during the dealings of receipt and payment of the bills, and the taking-forgotten bill accommodating unit for accommodating the bills which a user has forgotten to take out are constructed integrally with each other, and the charge reject accommodating unit which is integrated with the charge and collection box, and also includes the individual reject accommodating units which are obtained by the partition, whereby the strictness for the cash management which is made for the effective management of the bills by a foreman can be realized.

(4) out of the bill accommodating boxes, each of the boxes 80, and the charge and collection box 81 accumulates therein horizontally the bills in the upright state in a row to realize the bill accommodating unit having a large capacity. In addition, the reject box 60 vertically laminates the bills in the horizontal state to accumulate therein them. Also, the two bill accumulating units are separately arranged in the front part and the back part. As a result, the size in height of the bill recycle machine can be miniaturized.

(5) Since the bill recycle machine is constructed in such a way as to be separated into the upper bill carrying mechanism and the lower bill mechanism and also the bills until the dealings such as the received bill counting operation have been established are present only in the upper bill carrying mechanism, even if the jam is generated in the bills of interest, the lower bill mechanism and the bill accommodating boxes do not need to be opened, and hence the safety can be held. In addition, there is acquired the effect that the bills the right of ownership of which a user has (the bills which are present in the upper bill carrying mechanism) and the bills the right of ownership of which the associated bank has (the bills which are present the lower bill mechanism) can be clearly distinguished.

(6) The temporary storage box employs the rolling method by the guide tape, and not only stores temporarily the received bills, but also stores temporarily the paid reject bills, whereby it becomes the simpler storage box than the prior art one in which the temporary storage box is provided in the recycle box. In addition, not only the temporary storage box can cope with the dealings of receipt of multiple kinds of bills, but also by adopting the rolling method by the guide tape, can readily cope with the foreign bills the sizes of which are greatly different from one another. In addition, for the paid reject bills which are temporarily stored, the possibility that they are folded, worm or carried with inclination is high during the temporary storage. Thus, the bill recycle machine of the present embodiment becomes the machine in which the jam is hard to be generated with respect to these paid reject bills.

Figure 22:
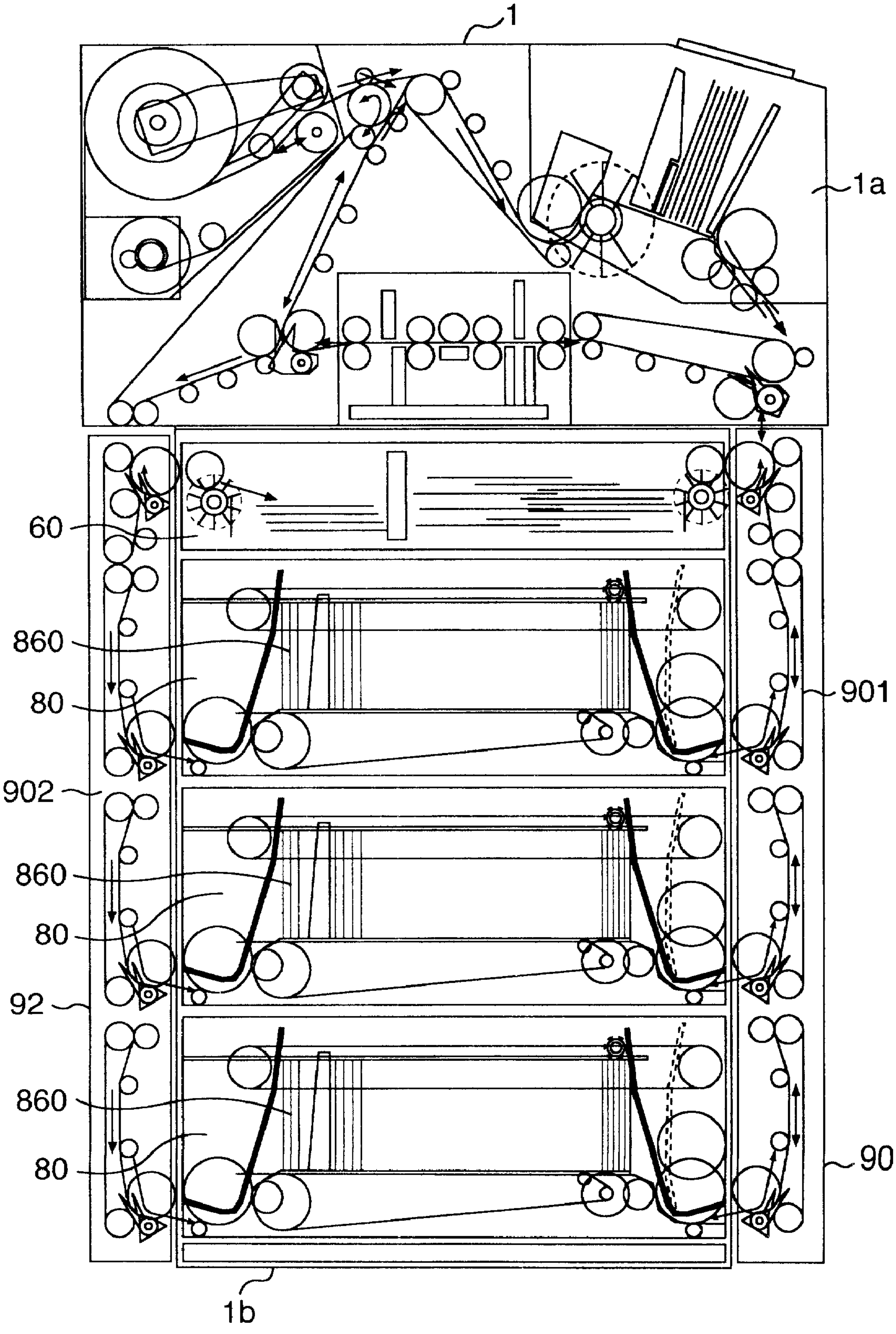
FIG. 22 is a side elevational view showing the construction of another example of the bill recycle machine.

Next, a bill recycle machine 1 according to another embodiment of the present invention will hereinbelow be described with reference to a side elevational view of FIG. 22.

A bill recycle machine 1 is constructed in such a way as to be divided into a upper bill carrying mechanism 1*a* and a lower bill carrying mechanism 1*b*. The upper bill carrying mechanism 1*a* has the same construction as that of the above-mentioned embodiment, but the lower bill carrying mechanism 1*b* is different therefrom in the following points.

(a) The bill accommodating boxes consist of the reject box 60 and the three recycle boxes 80 (they do not have the charge and collection box).

(b) The lower bill carrying path includes a front closing bill carrying path 90 which is the same in construction as in the above-mentioned example and which is arranged in the vicinity of the user manipulation sidewall face, and a back closing bill carrying path 92 which is arranged in the vicinity of the sidewall face opposite thereto.

(c) The reject box 60 has the two bill accommodating units in before and behind similarly to the first embodiment, and the bills are horizontally carried through the back closing bill carrying path 92 to be accumulated in the back bill accommodating unit.

(d) The recycle boxes 80 have bill accommodating units which are mechanically connected to the front closing bill carrying path 90 and each of which has the stack and separation mechanism which is the same as in the above-mentioned example, and reject accommodating units which are mechanically connected to the back closing bill carrying path 92 in the back thereof and which accommodate therein the reject bills every kind of bills. A foreman fills the recycle boxes 80 with the bills every kind of bills. The bills, which have been judged to be the reject, of the bills which have been supplied as the bills for payment from the recycle boxes 80 are accommodated in the units 860 for accommodating therein the reject bills every kind of bills. In addition, in the case where while the bills which have been temporarily accommodated in the temporary storage box in the dealings of receipt of the bills are accommodated in the recycle boxes 80 from the front opening bill carrying path 90 in order to carry out the recycle for the payment, the received bills are not recycled for the payment in terms of security of preventing the mal-payment due to the forged bills, these bills are accumulated in the units 860 for accommodating therein the reject bills every kind of bills.

As a result, the same effects as those in the above-mentioned example can be acquired. In addition thereto, the units for accommodating therein the reject bills every kind of bills by which the bills can be divided every kind of bills are provided, whereby the improvement in the security as described above can be realized.

In addition, the bill recycle machine 1 may also be constructed in the form of the following modifications.

Figure 23:
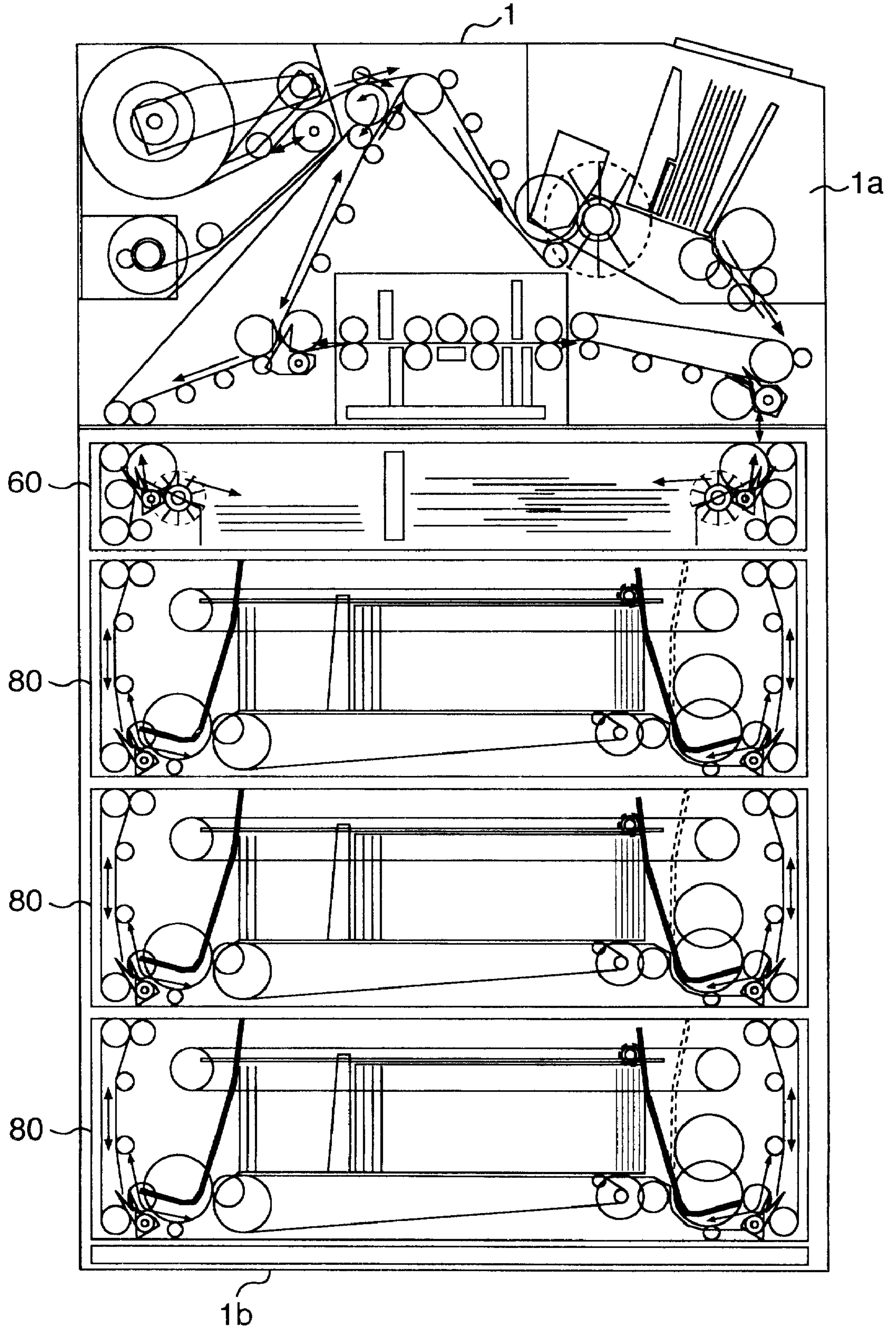
FIG. 23 is a side elevational view showing the construction of still another example of the bill recycle machine.

(1) While in the above-mentioned examples, the lower bill carrying path is provided in such a way as to be able to be opened and closed in the front or back of the bill accommodating boxes, for example, as the bill recycle machine 1 shown in FIG. 23, the lower bill carrying path is constructed in such a way as to be integrated with the inside of the reject box 60 and the recycle boxes 80.

Figure 24:
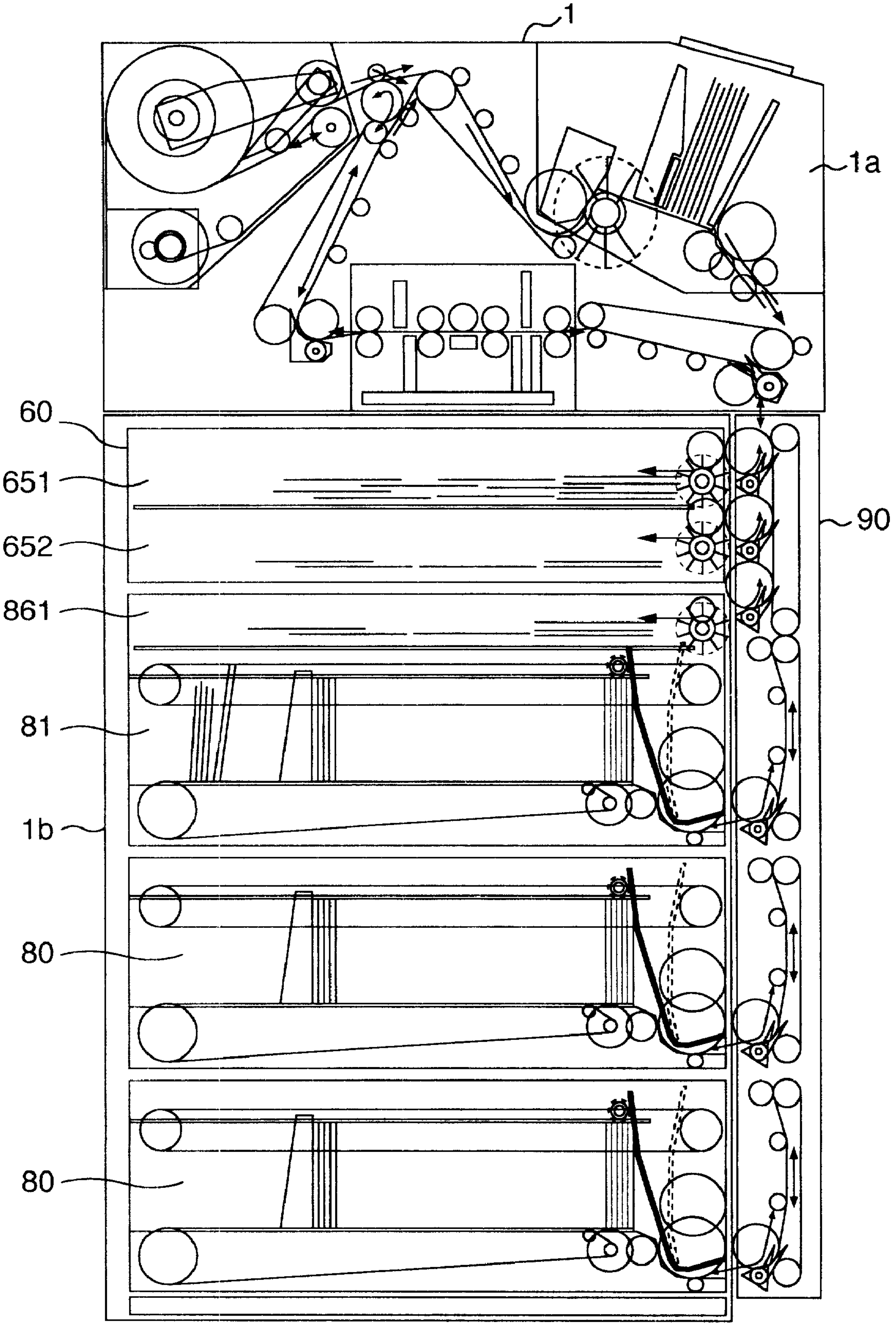
FIG. 24 is a side elevational view showing the construction of yet another example of the bill recycle machine (an example in which the reject box is vertically partitioned into two parts).

(2) For the reject box, and the charge and collection box each having the two bill accommodating boxes, the bill accommodating units thereof are not arranged in such a way as to be partitioned horizontally into the two parts, but are arranged in such a way as to be partitioned vertically into the two parts. In the bill recycle machine 1 shown in FIG. 24, the reject box 60 is partitioned into a upper bill accommodating unit 651 and a lower bill accommodating unit 652. Then, the upper bill accommodating unit 651 is used as the operational reject part, while the lower bill accommodating unit 652 is used as the taking-forgotten bill collecting part. In addition, a charge reject accommodating unit 861 is provided in the upper part of the charge and collection box 81. As a result, the lower bill carrying path has only to have the lower bill carrying path 90 which is provided in the front of the bill accommodating boxes. Therefore, though the height size of the machine is increased, this construction is advantageous in that the bill carrying path can be simplified.

(3) The bill hopper of the bill receiving and paying port is not used commonly, but the bill receiving port and a bill paying port are separately provided in the form of the bill receiving part and the bill paying part.

(4) The rolling type temporary storage box employing the rotating drum (refer to FIG. 18) is not adopted for the temporary storage box 40, but the construction of a lamination type as the recycle box (refer to FIG. 24) is adopted instead.

As set forth hereinabove, according to the present invention, it is possible to realize a small bill recycle machine which can cope with the space saving of the installation place and the space saving resulting from that a foreman can manipulate the machine either from the front side or from the back side in correspondence to the installation place of the machine. In addition, it is possible to improve the operationability, for a foreman, of bill accommodating boxes, the function of managing cash, and the aspect of security.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A bill recycling machine for receiving and paying bills, comprising:

a bill receiving and paying port through which bills which have been cast thereinto by a user are received or bills are discharged to a user;

a bill discriminating unit for discriminating the bills; and a plurality of bill accommodating boxes for accommodating therein the bills which have been received through said bill receiving and paying port by a user, or accommodating therein the bills which are to be paid to a user through said bill receiving and paying port, or accommodating therein the bills which are not submitted for recycle, wherein bill carrying paths which are formed by connecting mechanically said bill receiving and paying port and said plurality of bill accommodating boxes to each other through said bill discriminating unit; and said plurality of bill accommodating boxes are stacked vertically in said bill recycling machine, and are constructed to be manipulated from the front side and the back side of said bill recycling machine, and also the bill accommodating unit of at least one of said plurality of bill accommodating boxes is divided into a plurality of parts.

2. A bill recycling machine according to claim 1, wherein said divided bill accommodating box of said plurality of bill accommodating boxes includes a reject box for accommodating therein any of the bills which have been rejected in said bill discriminating unit, and said reject box is stacked in the upper row with respect to other bill accommodating boxes, the bill accommodating unit of which is not divided.

3. A bill recycling machine according to claim 1, wherein said plurality of bill accommodating boxes includes: recycling boxes for accommodating therein the bills which have been received through said bill receiving and paying port and paying the bills, which are accommodated therein, through said bill receiving and paying port; and a charge and collection box for accommodating therein the bills with which said recycling box is to be charged and accommodating the bills which have been collected from the associated one of said recycling boxes, the bill accommodating unit of said charge and collection box is divided into a plurality of parts, and the bill accommodating unit which is divided into said plurality of parts has an accommodating unit for accommodating therein the reject bills which are not accommodated in both of said recycling boxes.

4. A bill recycling machine according to claim 1, wherein said plurality of bill accommodating boxes have said divided bill accommodating box and the bill accommodating box which is not divided, and said divided bill accommodating box is carried in the upper row with respect to said bill accommodating box which is not divided.

5. A bill recycling machine according to claim 3, wherein said charge and collection box is carried in the upper row with respect to said recycling boxes.

6. A bill recycling machine according to claim 1, wherein said bill accommodating box in which its bill accommodating unit for accommodating therein the bills is divided into a plurality of parts includes: an operation reject accommodating unit for accommodating therein the bills with which the abnormality has been found out in the dealings of receipt of the bills; and a taking-forgotten bill collecting unit for accommodating therein the paid bills which a user has forgotten to take out in said bill receiving and paying port.

7. A bill recycling machine according to claim 1, wherein said bill accommodating box is which its bill accommodating unit for accommodating therein the bills is divided into a plurality of parts includes: an operational reject accommodating unit for accommodating therein the bills the kinds of which have not been able to be discriminated by said bill discriminating unit in the dealings of payment of the bills or the bills with which the carrying abnormality has been found out; and a taking-forgotten bill collecting unit for accommodating therein the paid bills which a user has forgotten to take out in said bill receiving and paying port.

8. A bill recycling machine according to claim 2, wherein said plurality of bill accommodating boxes includes: recycling boxes for accommodating therein the bills which have been received through said bill receiving and paying port and paying the bills, which are accommodated therein, through said bill receiving and paying port; and said reject box, and said reject box has: an operational reject accommodating unit for accommodating therein the bills which have not been accommodated in any of the said recycling boxes in the dealings of receipt of the bills; and a taking-forgotten bill collecting unit for accommodating therein the paid bills which a user has forgotten to take out in said bill receiving and paying port.

9. A bill recycling machine according to claim 2, wherein said plurality of bill accommodating boxes includes: recycling boxes for accommodating therein the bills which have been received through said bill receiving and paying port and paying the bills, which are accommodated therein, through said bill receiving and paying port; and said reject box, and said reject box has: an operational reject accommodating unit for accommodating therein the bills the kinds of which have not been able to be discriminated by said bill discriminating unit in the dealings of payment of the bills; and a taking-forgotten bill collecting unit for accommodating therein the paid bills which a user has forgotten to take out in said bill receiving and paying port.

10. A bill recycling machine according to claim 2, wherein said plurality of bill accommodating boxes includes: recycling boxes for accommodating therein the bills which have been received through said bill receiving and paying port and paying the bills, which are accommodated therein, through said bill receiving and paying port; a reject box for accommodating therein the bills which have been rejected in said bill discriminating unit; and a charge and collection box for accommodating therein the bills with which said recycling boxes are to be charged and accommodating therein the bills which have been collected from said recycling boxes, wherein said reject box is carried above said charge and collection box, and said charge and collection box is carried above said recycling boxes.

11. A bill recycling machine according to claim 1, wherein the lower bill carrying path, which is formed along said bill accommodating boxes which are carried, of said bill carrying paths is arranged in the vicinity of a door of said bill recycling machine and is constructed in such a way as to be opened and closed similarly to said door.

12. A bill recycling machine for receiving and paying bills, comprising:

a bill receiving and paying port through which bills which have been cast thereinto by a user are received or bills are discharged to a user;

a bill discriminating unit for discriminating the bills;

a plurality of bill accommodating boxes for accommodating therein the bills; and bill carrying paths which are formed by connecting mechanically said bill receiving and paying port and said plurality of bill accommodating boxes to each other through said bill discriminating unit, wherein said plurality of bill accommodating boxes are carried vertically in said bill recycling machine;

said bill carrying paths have a lower bill carrying path which is vertically formed along said plurality of bill accommodating boxes which are vertically carried, and a upper bill carrying path which is arranged above said plurality of bill accommodating boxes and through which said bill receiving and paying port and said bill discriminating units are mechanically connected to each other;

said lower bill carrying path has the function of receiving the bills which have been carried from said plurality of bill accommodating boxes or delivering the bills to said plurality of bill accommodating boxes, and also carries therethrough the bills bidirectionally;

said upper bill carrying path includes a bill carrying path for carrying unidirectionally therethrough the bills;

said plurality of bill accommodating boxes includes a first bill accommodating box having a bill accommodating unit the internal structure of which is divided into a plurality of parts; and said first carrying box has a bill accommodating unit for accommodating therein the bills which have been carried from said lower bill carrying path, and a bill accommodating unit for accommodating therein the bills which have been carried from said upper bill carrying path.

13. A bill recycling machine according to claim 12, wherein said plurality of bill accommodating boxes include a second bill accommodating box having a bill accommodating unit the internal structure of which is not divided into a plurality of parts, and said first bill accommodating box.

14. A bill recycling machine according to claim 13, wherein said first bill accommodating box is constructed in such a way as to be arranged above said second bill accommodating box.

15. A bill recycling machine according to claim 14, wherein said first bill accommodating box has a third bill carrying path for carrying therethrough the bills to the bill accommodating boxes which are arranged below said first bill accommodating box, and said third bill carrying path is mechanically connected to said upper bill carrying path.

16. A bill recycling machine according to claim 12, wherein said second bill accommodating box includes recycling boxes for accommodating therein the bills which have been received through said bill receiving and paying port and paying the bills, which are accommodated therein, through said bill receiving and paying port; and said first bill accommodating box includes a reject box for accommodating therein the reject bills which are not accommodated in said recycling boxes.

17. A bill recycling machine according to claim 16, wherein said reject box is constructed in such a way as to be divided into an operational reject accommodating unit for accommodating therein the non-circulating bills which are not accommodated in said recycling boxes in the dealings of receipt of the bills, and a taking-forgotten bill accommodating unit for accommodating therein the bills which a user has forgotten to take out from said bill receiving and paying port.

18. A bill recycling machine according to claim 12, wherein said second bill accommodating box includes recycling boxes for accommodating therein the bills which have been received through said bill receiving and paying port and paying the bills, which are accommodated therein, through said bill receiving and paying port;

said first bill accommodating box includes a charge and collection box for accommodating therein the bills with which said recycling boxes are to be charged and accommodating therein the bills which have been collected from said recycling box; and the bill accommodating unit of said charge and collection box is divided into a plurality of parts, and said bill accommodating unit which is divided into a plurality of parts includes a bill accommodating unit for accommodating therein the reject bills which are not accommodated in said recycling boxes.

19. A bill recycling machine for receiving and paying bills, comprising:

a bill receiving and paying port through which bills which have been cast thereinto by a user are received or bills are discharged to a user;

a bill discriminating unit for discriminating the bills;

a plurality of bill accommodating boxes for accommodating therein the bills; and bill carrying paths which are formed by connecting mechanically said bill receiving and paying port and said plurality of bill accommodating boxes to each other through said bill discriminating unit, wherein said plurality of bill accommodating boxes are carried vertically in said bill recycling machine;

said bill carrying paths have a lower bill carrying path which is vertically formed along said plurality of bill accommodating boxes which are vertically carried, and a upper bill carrying path which is arranged above said plurality of bill accommodating boxes and through which said bill receiving and paying port and said bill discriminating units are mechanically connected to each other;

said lower bill carrying path has the function of receiving the bills which have been carried from said plurality of bill accommodating boxes or delivering the bills to said plurality of bill accommodating boxes, and also carries therethrough the bills bidirectionally;

said upper bill carrying path includes a bill carrying path for carrying unidirectionally therethrough the bills;

said plurality of bill accommodating boxes includes a first bill accommodating box having a bill accommodating unit the internal structure of which is divided into a plurality of parts;

said first bill carrying box has a first bill accommodating unit for accommodating therein the bills which have been carried from said lower bill carrying path, and a second bill accommodating unit for accommodating therein the bills which have been carried from said upper bill carrying path;

said second bill accommodating unit included in said first bill accommodating box has a bill approach port for receiving the bills through said upper bill carrying path, a first path part for carrying therethrough the bills which have been carried through said bill approach port to said second bill accommodating unit, a second path part for carrying therethrough the bills to other bill accommodating boxes which are arranged below said first bill accommodating box, and a selection part for selecting between said first path and said second path part.

* * * * *

UNITED STATES PATENT AND TRADEMARK OFFICE

CERTIFICATE OF CORRECTION

PATENT NO. : 6,481,620 B1 Page 1 of 1
DATED : November 19, 2002
INVENTOR(S) : Katou et al.

It is certified that error appears in the above-identified patent and that said Letters Patent is hereby corrected as shown below:

Title page,
Please add Item [30], Foreign Application Priority Data, to read as follows:
-- [30] Foreign Application Priority Date
Oct. 19, 1999 [JP] Japan . . . . . . 11-296533 --

Signed and Sealed this

Eighteenth Day of March, 2003

JAMES E. ROGAN
*Director of the United States Patent and Trademark Office*